United States Patent
Awoniyi-Oteri et al.

(10) Patent No.: US 11,844,071 B2
(45) Date of Patent: Dec. 12, 2023

(54) RULE BASED HYBRID AUTOMATIC REPEAT REQUEST PROCESS IDENTIFIER SHARING FOR MULTIPLE SEMI PERSISTENTLY SCHEDULED CONFIGURATIONS

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Ozcan Ozturk, San Diego, CA (US); Jing Sun, San Diego, CA (US); Sony Akkarakaran, Poway, CA (US); Junyi Li, Fairless Hills, PA (US); Xiaoxia Zhang, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/332,867

(22) Filed: May 27, 2021

(65) Prior Publication Data

US 2021/0377985 A1     Dec. 2, 2021

Related U.S. Application Data

(60) Provisional application No. 63/032,497, filed on May 29, 2020.

(51) Int. Cl.
*H04W 72/1273* (2023.01)
*H04L 1/1867* (2023.01)
*H04L 1/1812* (2023.01)

(52) U.S. Cl.
CPC ....... *H04W 72/1273* (2013.01); *H04L 1/1819* (2013.01); *H04L 1/1896* (2013.01)

(58) Field of Classification Search
CPC .............. H04W 72/1273; H04W 72/23; H04L 1/1819; H04L 1/1896; H04L 1/1874;
(Continued)

(56) References Cited

U.S. PATENT DOCUMENTS

| | | | |
|---|---|---|---|
| 2012/0113946 A1* | 5/2012 | Seo ........................ | H04L 5/0094 370/329 |
| 2014/0092824 A1* | 4/2014 | He ........................ | H04L 5/0055 370/329 |

(Continued)

OTHER PUBLICATIONS

CATT: "MAC-Specific Aspects of SPS&CG Configurations", 3GPP Draft, 3GPP TSG-RAN WG2 Meeting #105bis, R2-1903149 MAC-Specific Aspects of SPS&CG Configurations, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700503, 3 pages.

(Continued)

*Primary Examiner* — Abdullahi Ahmed
(74) *Attorney, Agent, or Firm* — Patterson + Sheridan, L.L.P.

(57) ABSTRACT

Techniques and apparatus for avoiding hybrid automatic repeat request (HARQ) process identifier (ID) conflicts in scenarios where multiple semi persistently scheduled (SPS) configurations share the same pool of HARQ process IDs are provided. One technique involves receiving an indication of SPS configurations, where each SPS configuration allocates a set of SPS occasions for physical downlink shared channel (PDSCH) transmissions. A conflict is detected between a first HARQ process ID associated with a first SPS occasion of a first SPS configuration and a second (Continued)

HARQ process ID associated with a second SPS occasion of a second SPS configuration, where the first SPS occasion occurs prior to the second SPS occasion. At least one action to resolve the conflict is taken based on predetermined rule(s), in response to detecting the conflict.

30 Claims, 14 Drawing Sheets

(58) Field of Classification Search
CPC ... H04L 1/1825; H04L 1/1887; H04L 1/1822; H04L 1/1812
See application file for complete search history.

(56) References Cited

U.S. PATENT DOCUMENTS

| | | | | |
|---|---|---|---|---|
| 2017/0026942 | A1* | 1/2017 | Vajapeyam | H04W 72/04 |
| 2019/0149279 | A1* | 5/2019 | Lee | H04L 1/1887 |
| | | | | 370/329 |
| 2021/0360652 | A1* | 11/2021 | Awoniyi-Oteri | H04L 1/1621 |
| 2021/0377986 | A1* | 12/2021 | Awoniyi-Oteri | H04L 1/1896 |
| 2023/0029858 | A1* | 2/2023 | Zhang | H04L 5/14 |

OTHER PUBLICATIONS

CATT: "Multiple Active SPS and Configured Grant Configurations", 3GPP Draft, 3GPP TSG-RAN WG2 Meeting 105, R2-1900152, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 15, 2019 (Feb. 15, 2019), XP051601552, 5 pages, Retrieved from the Internet: URL: http://www.3gpp.org/ftp/tsg%5Fran/WG2%5FRL2/TSGR2%5F105/Docs/R2%2D1900152%2Ezip [retrieved on Feb. 15, 2019], the whole document.
International Search Report and Written Opinion—PCT/US2021/034944—ISA/EPO—dated Sep. 10, 2021.
NTT Docomo Inc: "SPS Enhancements for TSC Traffic," 3GPP Draft, 3GPP TSG-RAN WG2 #105bis, R2-1903584, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700927, 4 pages, Retrieved from the Internet: URL: http://www.3gpp.org/ftp/Meetings%5F3GPP%5FSYNC/RAN2/Docs/R2%2D1903584%2Ezip [retrieved on Apr. 6, 2019] p. 2-p. 3.

* cited by examiner

RULE BASED HYBRID AUTOMATIC REPEAT REQUEST PROCESS IDENTIFIER SHARING FOR MULTIPLE SEMI PERSISTENTLY SCHEDULED CONFIGURATIONS

CROSS-REFERENCE TO RELATED APPLICATION

This application claims the benefit of and priority to U.S. Provisional Application No. 63/032,497, filed May 29, 2020, which is assigned to the assignee hereof and hereby expressly incorporated by reference herein.

BACKGROUND

I. Field of the Disclosure

Aspects of the present disclosure relate to wireless communications, and more particularly, to rule-based techniques for avoiding hybrid automatic repeat request (HARQ) process identifier (ID) conflicts in scenarios where multiple semi persistently scheduled (SPS) configurations share the same pool of HARQ process IDs.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for avoiding HARQ process ID conflicts in scenarios where multiple SPS configurations share a set of HARQ process IDs.

Certain aspects of the subject matter described in this disclosure can be implemented in a method for wireless communication performed by a network entity, such as base station. The method generally includes determining a plurality of semi persistently scheduled (SPS) configurations for a user equipment (UE), each SPS configuration allocating the UE with a set of SPS occasions for physical downlink shared channel (PDSCH) transmissions. The method also includes detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The method further includes, in response to detecting the conflict, taking at least one action to resolve the conflict, based on one or more predetermined rules.

Certain aspects of the subject matter described in this disclosure can be implemented in an apparatus for wireless communication. The apparatus may include a processing system, comprising: a memory comprising computer-executable instructions and one or more processors configured to execute the computer-executable instructions and cause the processing system to: determine a plurality of semi persistently scheduled (SPS) configurations for a user equipment (UE), each SPS configuration allocating the UE with a set of SPS occasions for physical downlink shared channel (PDSCH) transmissions; detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and, in response to detecting the conflict, take at least one action to resolve the conflict, based on one or more predetermined rules.

Certain aspects of the subject matter described in this disclosure can be implemented in an apparatus for wireless communication. The apparatus may include means for determining a plurality of semi persistently scheduled (SPS) configurations for a user equipment (UE), each SPS configuration allocating the UE with a set of SPS occasions for physical downlink shared channel (PDSCH) transmissions. The apparatus also includes means for detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The apparatus further includes means for taking at least one action to resolve the conflict, based on one or more predetermined rules, in response to detecting the conflict.

Certain aspects can be implemented in a non-transitory computer-readable medium for wireless communication by a network entity. The non-transitory computer-readable medium may comprise computer-executable instructions that, when executed by one or more processors of a processing system, cause the processing system to: determine a plurality of semi persistently scheduled (SPS) configurations for a user equipment (UE), each SPS configuration allocating the UE with a set of SPS occasions for physical downlink shared channel (PDSCH) transmissions; detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and, in response to detecting the conflict, take at least one action to resolve the conflict, based on one or more predetermined rules.

Certain aspects can be implemented in a computer program product for wireless communication by a network entity embodied on a computer-readable storage medium. The computer-readable storage medium may include code for: determining a plurality of semi persistently scheduled (SPS) configurations for a user equipment (UE), each SPS configuration allocating the UE with a set of SPS occasions for physical downlink shared channel (PDSCH) transmissions; detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and, in response to detecting the conflict, taking at least one action to resolve the conflict, based on one or more predetermined rules.

Certain aspects of the subject matter described in this disclosure can be implemented in a method for wireless communication performed by a UE. The method generally includes receiving an indication of a plurality of semi persistently scheduled (SPS) configurations for a user equipment (UE), each SPS configuration allocating the UE with a set of SPS occasions for physical downlink shared channel (PDSCH) transmissions. The method also includes detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasions. The method further includes, in response to detecting the conflict, taking at least one action to resolve the conflict, based on one or more predetermined rules.

Certain aspects of the subject matter described in this disclosure can be implemented in an apparatus for wireless communication. The apparatus may include a receiver configured to receive an indication of a plurality of semi persistently scheduled (SPS) configurations for the apparatus, each SPS configuration allocating the apparatus with a set of SPS occasions for physical downlink shared channel (PDSCH) transmissions. The apparatus may also include a processing system, comprising: a memory comprising computer-executable instructions and one or more processors configured to execute the computer-executable instructions and cause the processing system to: detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, take at least one action to resolve the conflict, based on one or more predetermined rules.

Certain aspects of the subject matter described in this disclosure can be implemented in an apparatus for wireless communication. The apparatus may include means for receiving an indication of a plurality of semi persistently scheduled (SPS) configurations for the apparatus, each SPS configuration allocating the apparatus with a set of SPS occasions for physical downlink shared channel (PDSCH) transmissions. The apparatus also includes means for detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasions. The apparatus further includes means for taking at least one action to resolve the conflict, based on one or more predetermined rules, in response to detecting the conflict.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: receive an indication of a plurality of semi persistently scheduled (SPS) configurations for the UE, each SPS configuration allocating the UE with a set of SPS occasions for physical downlink shared channel (PDSCH) transmissions; detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasions; and in response to detecting the conflict, take at least one action to resolve the conflict, based on one or more predetermined rules.

Certain aspects can be implemented in a computer program product for wireless communication by a user equipment (UE) embodied on a computer-readable storage medium. The computer-readable storage medium may include code for: receiving an indication of a plurality of semi persistently scheduled (SPS) configurations for the UE, each SPS configuration allocating the UE with a set of SPS occasions for physical downlink shared channel (PDSCH) transmissions; detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasions; and, in response to detecting the conflict, taking at least one action to resolve the conflict, based on one or more predetermined rules.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
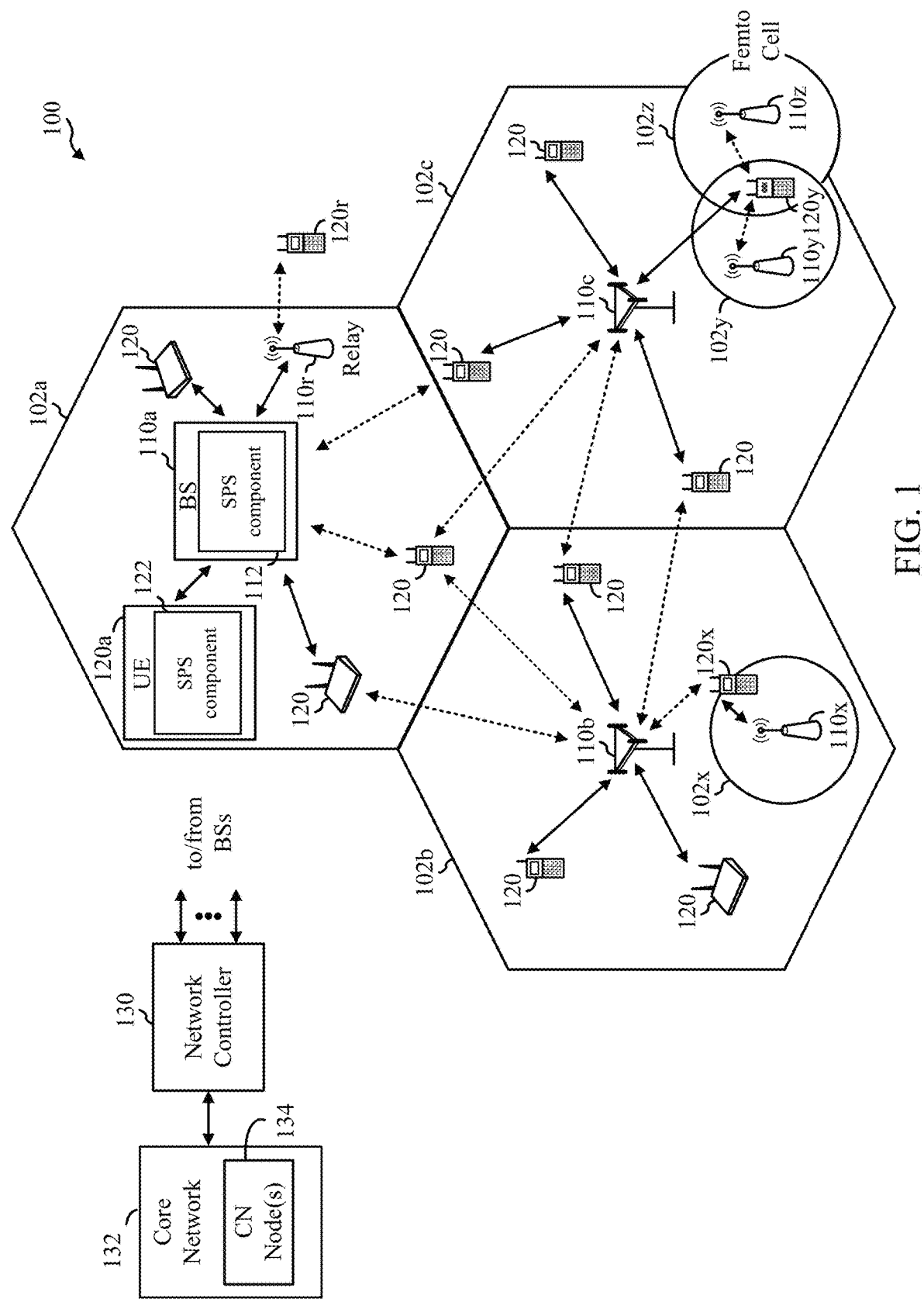
FIG. 1 is a block diagram conceptually illustrating an example telecommunications system, in accordance with certain aspects of the present disclosure.

Aspects of the present disclosure provide apparatus, methods, processing systems, and computer readable mediums for using predetermined rules to avoid hybrid automatic repeat request (HARQ) process identifier (ID) conflicts in scenarios where multiple semi-persistent scheduled (or semi-persistent scheduling) (SPS) configurations share the same pool of HARQ process IDs.

Some wireless communication systems may support SPS as a type of resource allocation (or scheduling) for downlink communications. SPS resource allocation generally refers to a scheduling technique where a UE is pre-configured (by the network/base station) with resources having a periodicity and offset for monitoring for downlink transmissions. The network can provide the UE with an SPS transmission periodicity via radio resource control (RRC) signaling. When SPS is activated (e.g., via downlink control information (DCI)), the UE can receive SPS transmissions (e.g., physical downlink shared channel (PDSCH) transmission(s)) with the periodicity provided by RRC signaling and transmission parameters indicated by the network (as opposed to receiving a DCI prior to each data transmission).

In some cases, a wireless communication system may allow a UE to use multiple SPS configurations. An SPS configuration generally refers to a configuration of resources (e.g., via RRC signaling) having a periodicity for SPS transmissions (e.g., PDSCH transmissions). In other words, once activated, the configured periodic resources may be used for data transmission on downlink until deactivated, without dynamic resource allocation via DCI prior to each data transmission.

Each SPS configuration may be associated with one or more (periodic) SPS occasions (also referred to as data channel occasions), during which the gNB performs a SPS transmission (e.g., a PDSCH transmission) and the UE monitors for the SPS transmission. As used herein, the term "SPS occasion" generally refers to a time (or time interval)

in which resource(s) are allocated for a SPS transmission (e.g., PDSCH transmission) that may or may not ultimately happen.

One issue with using multiple SPS configurations is that conflicts may arise in situations where the multiple SPS configurations share the same pool of HARQ process IDs. For example, the UE may determine a HARQ process ID for a (subsequent) SPS occasion of a first SPS configuration that conflicts with the HARQ process ID for a (previous) SPS occasion of a second SPS configuration. Current techniques for mitigating HARQ process ID conflicts between multiple SPS configurations generally involve utilizing a HARQ process ID offset into the calculation of the HARQ process ID for a given SPS occasion. This current approach may be insufficient to mitigate HARQ process ID conflicts, as HARQ process ID conflicts may still occur with the use of a HARQ process ID offset.

Accordingly, aspects disclosed herein provide one or more rule-based techniques for avoiding HARQ process ID conflicts between multiple SPS configurations. As described in more detail below, in some aspects, the gNB and/or UE may determine, based on one or more (predetermined) rules, to replace the HARQ process ID of the SPS occasion that has a HARQ process ID conflict. In some aspects, the gNB and/or UE may determine, based on the one or more rules, to skip assignment of a HARQ process ID of the SPS occasion that has a HARQ process ID conflict.

The following description provides examples of HARQ process ID assignment for multiple SPS configurations sharing the same HARQ process ID pool in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured to reduce (and/or avoid) HARQ process ID conflicts in scenarios where multiple SPS configurations share the same HARQ process ID pool. As shown in FIG. 1, the BS 110a includes a SPS component 112, which is configured to implement one or more of the techniques described herein for avoiding HARQ process ID conflicts. In some aspects, the SPS component 112 may be configured to perform one or more of the operations illustrated in FIG. 11. As shown in FIG. 1, the UE 120a includes a SPS component 122, which is configured to implement one or more of the techniques described herein for avoiding HARQ process ID conflicts. In some aspects, the SPS component 122 may be configured to perform one or more of the illustrated in FIG. 12.

Figure 2:
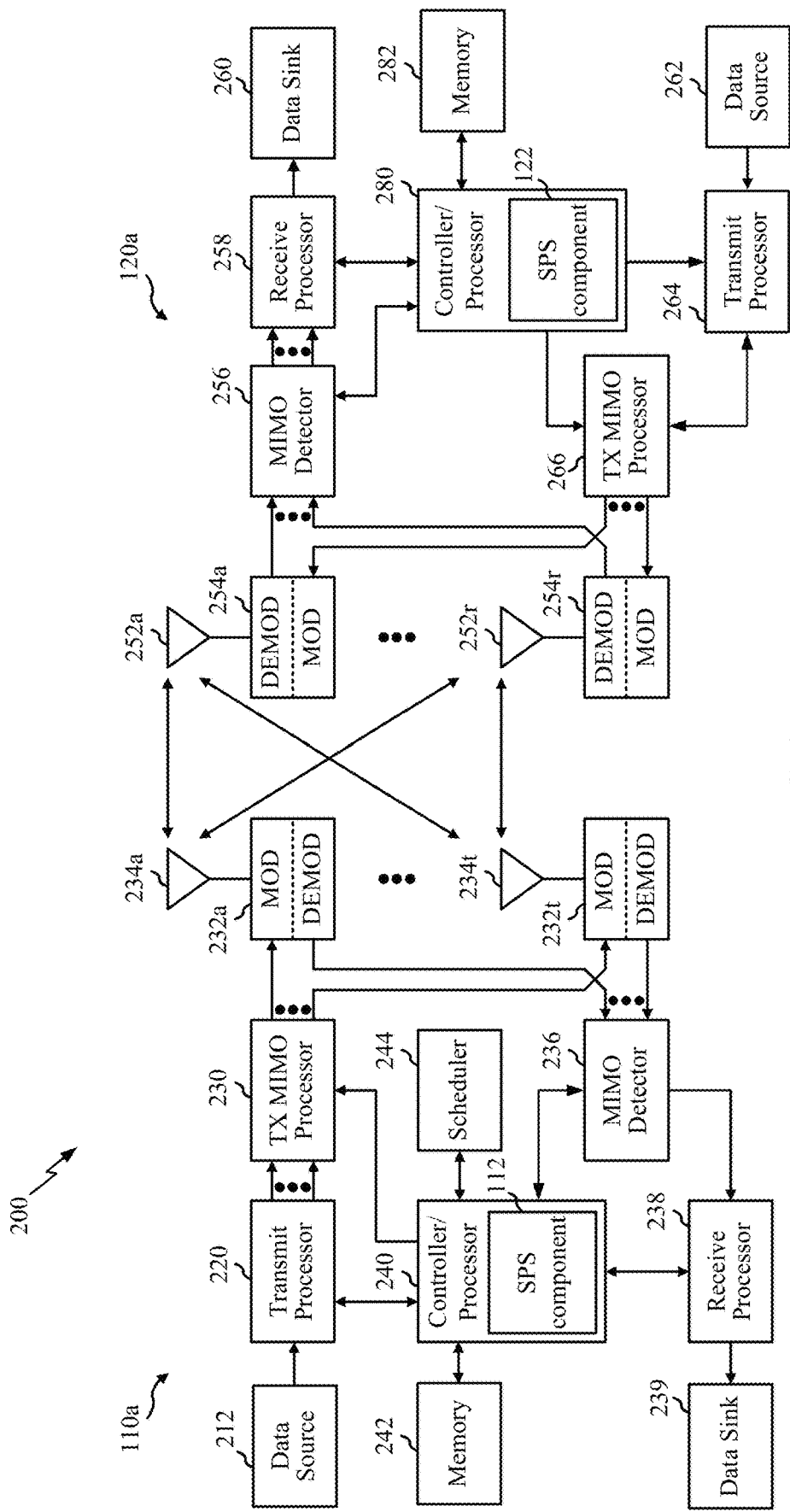
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a SPS component 112 that may be configured for avoiding HARQ process ID conflicts, according to aspects described herein. As shown in FIG. 2, the controller/processor 280 of the UE 120a has a SPS component 122 that may be configured for avoiding HARQ process ID conflicts, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
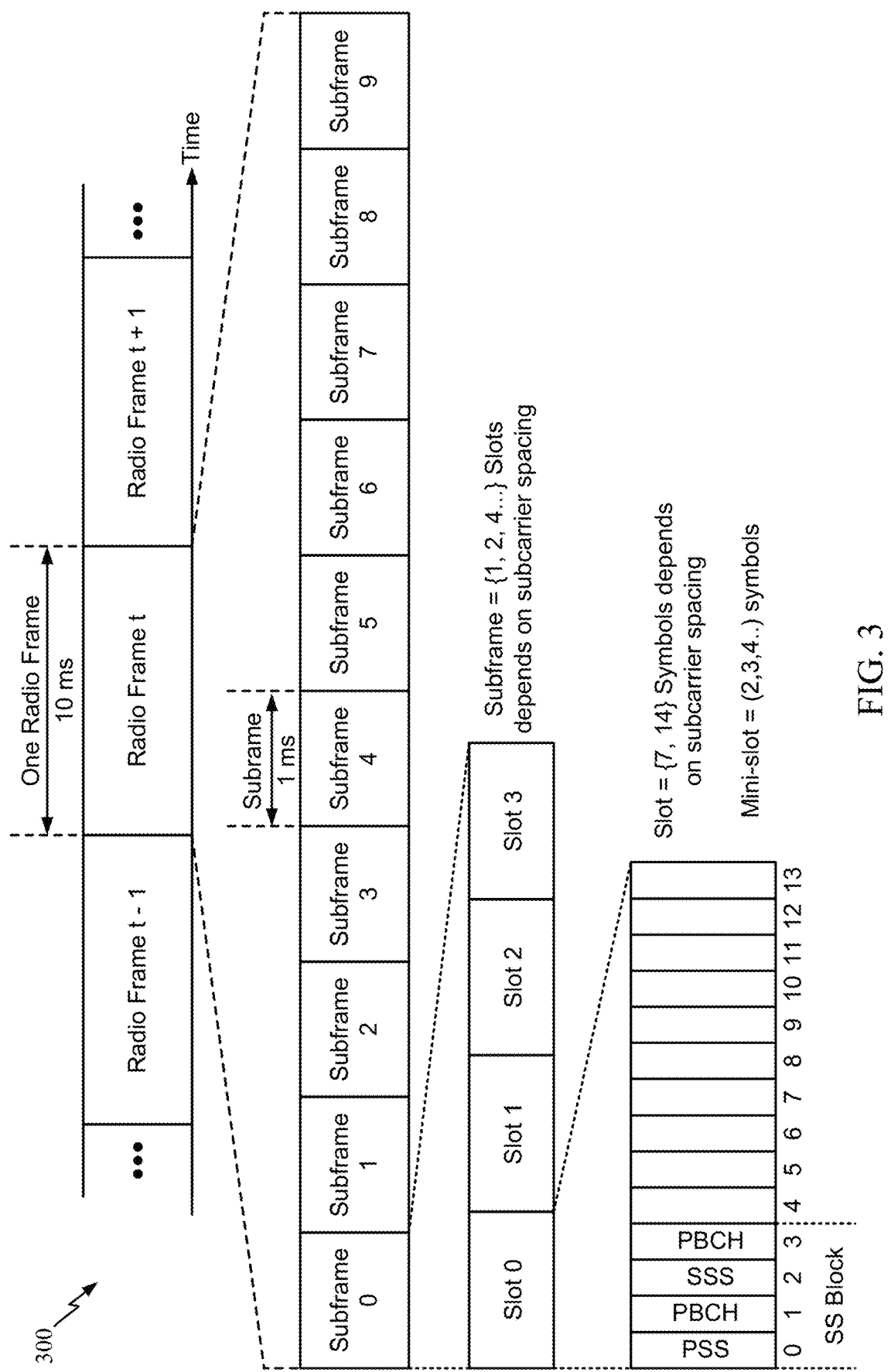
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 4:
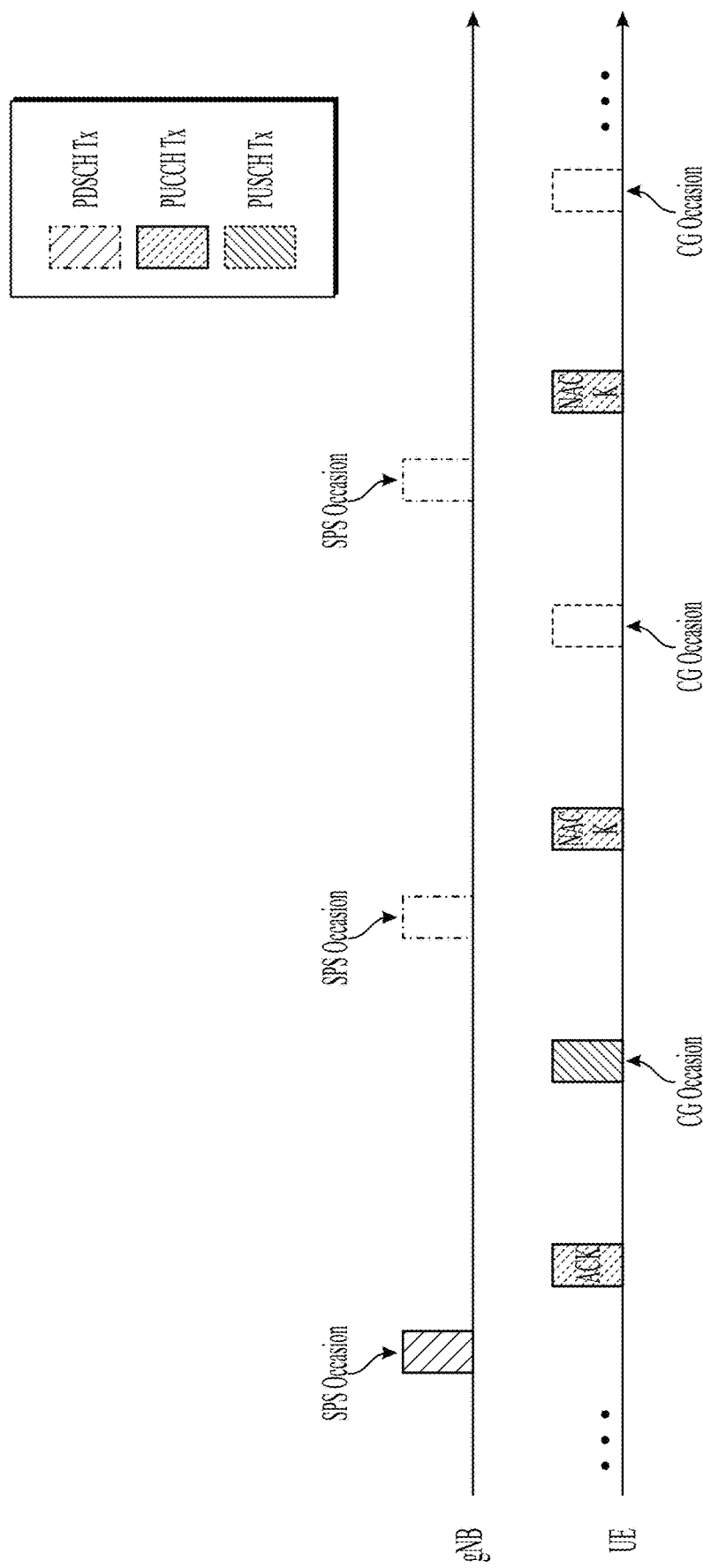
FIG. 4 illustrates an example of SPS occasions and configured grant (CG) occasions, in accordance with certain aspects of the present disclosure.

In some aspects, the wireless communication system 100 may support SPS resource allocation. SPS resource allocation, which is sometimes called configured downlink assignment, refers to a scheduling technique where a UE is pre-configured by the network/base station (e.g., eNBs, gNB, etc.) with a periodicity and an offset. As illustrated in FIG. 4, once pre-configured, if the UE were to receive an allocation of downlink resources, then the allocation of SPS occasions would repeat according to the pre-configured periodicity, resulting in periodic SPS occasions. For SPS, the base station may use RRC signaling to define the periodicity of configured downlink assignments. For example, an SPS configuration may include a periodicity (p) where the periodicity is the time between two consecutive SPS occasions. Similarly, once configured with configured grant (CG) occasions, the allocation of CG occasions (for uplink transmissions) may repeat according to the pre-configured periodicity.

As used herein, the term occasion generally refers to a time in which resource are allocated for a transmission that may or may not ultimately happen. As noted, the term "SPS occasion" generally refers to a time (or time interval) in which resource(s) are allocated for a SPS transmission (e.g., PDSCH transmission) that may or may not ultimately happen. For example, a downlink transmission may or may not occur in an SPS occasion. Similarly, the term "CG occasion" generally refers to a time (or time interval) in which resource(s) are allocated for a CG transmission (e.g., uplink transmission) that may or may not ultimately happen. For example, an uplink transmission may or may not occur in a CG occasion. Occasions may be considered activated if the transmission may occur and, thus, those occasions should be monitored. In some cases, although an SPS configuration may be active, one or more of the SPS occasions may be empty (e.g., not have a data channel transmission).

In some cases, a UE may provide acknowledgment (e.g., hybrid automatic repeat request or HARQ) feedback, indicating whether it received a PDSCH transmission in one or more of the configured SPS occasions. In some systems (e.g., in Rel. 15) an N1-PUCCH-AN may be used to specify preconfigured PUCCH resources to be used for SPS HARQ feedbacks. For example, a PUCCH resource using PUCCH formats 0 or 1 can support up to 2 bits of feedback.

In some systems (e.g., in Rel. 16 systems), multiple SPS configurations are allowed. Each SPS configuration may include a set of SPS occasions, during which the gNB performs a SPS transmission (e.g., PDSCH transmission). One potential challenge in such cases, however, is how or if to share the HARQ process pool among multiple SPS configurations. If the HARQ process pool is shared, a HARQ Process ID offset can be used to reduce overlapping (or conflicting) HARQ processes between the SPS configurations, according to the following Equation (1) in TS 38.321:

$$\text{HARQ Process ID} = [\text{floor}(\text{CURRENT\_slot}/\text{periodicity})] \text{ modulo nrofHARQ-Processes} + \text{harq-procID-offset} \quad (1)$$

where CURRENT_slot=[(SFN×numberOfSlotsPerFrame)+slot number in the frame] and numberOfSlotsPerFrame refers to the number of consecutive slots per frame (as specified in TS 38.211 [8]).

In some cases, assigning HARQ process IDs based on Equation (1) may not be sufficient to avoid conflicting HARQ processes between multiple SPS configurations. For example, while Equation (1) relies on a HARQ process ID offset for each SPS configuration to reduce HARQ process ID conflicts between multiple SPS configurations, in cases where the SPS configurations have different periodicities, a HARQ process ID conflict may still occur.

Figure 5:
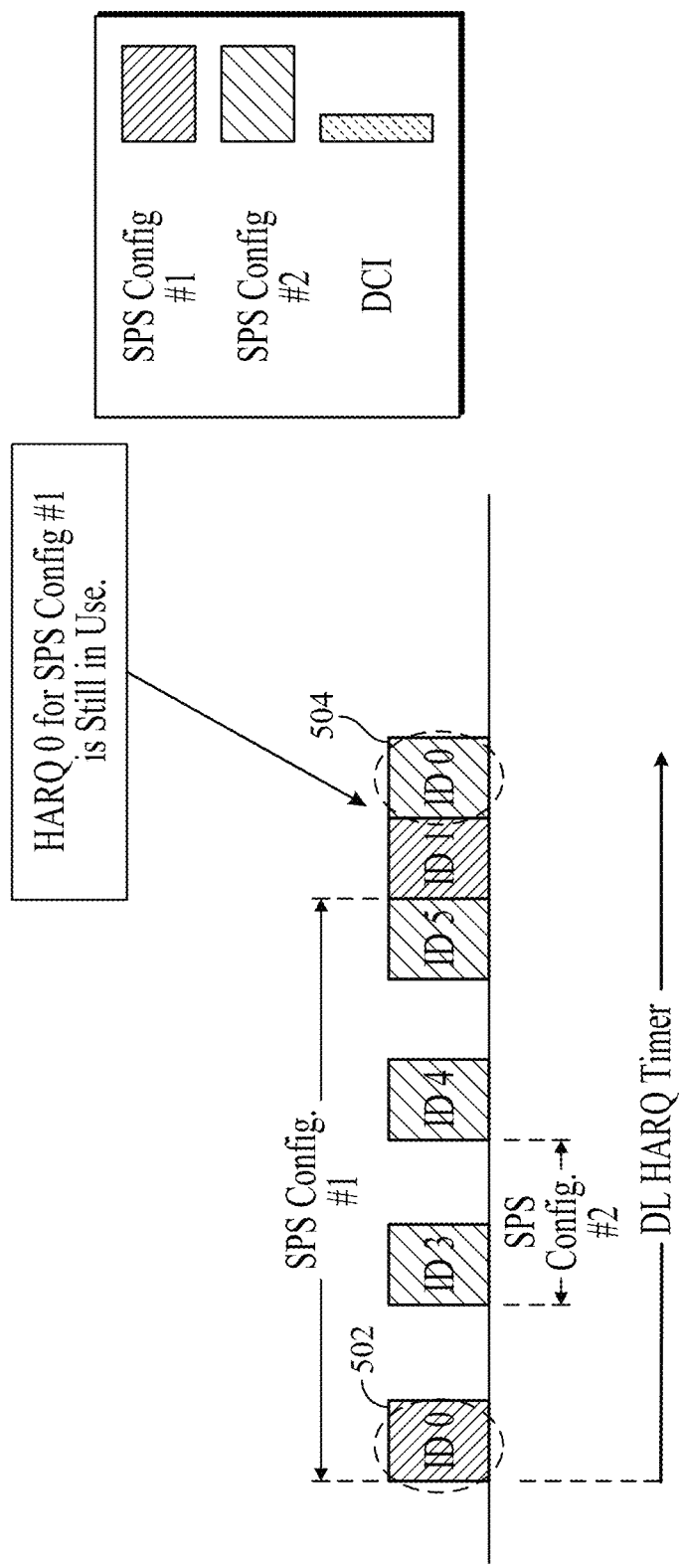
FIG. 5 illustrates an example scenario of a HARQ process ID conflict between multiple SPS configurations, in accordance with certain aspects of the present disclosure.

For example, consider the scenario depicted in FIG. 5 where the HARQ process ID 0 has a conflict between SPS configuration #1 and SPS configuration #2. In this scenario, SPS configuration #1 includes one SPS occasion, SPS configuration #2 includes one SPS occasion, SPS configuration #1 is RRC configured with a HARQ process ID offset of 0, SPS configuration #2 is RRC configured with a HARQ process ID offset of 3, and SPS configurations #1 and #2 share six HARQ processes (e.g., nrofHARQ-Process=6).

As shown, a HARQ process ID 0 may be determined for SPS occasion 502 of SPS configuration #1 and SPS occasion 504 of SPS configuration #2, based on Equation 1. However, because HARQ process ID 0 for SPS occasion 502 may still be in use by SPS configuration #1 when the UE/gNB computes HARQ process ID 0 for SPS occasion 504 of SPS configuration #2, there may be conflict between the use of this HARQ process between SPS configuration #1 and SPS configuration #2. In this particular example, the gNB may not be able to release HARQ process ID 0 from SPS configuration #1 (at the time of SPS occasion 504) because HARQ process ID 0 for SPS configuration #1 may still be in the HARQ buffer awaiting HARQ feedback, there may be a pending retransmission, the DL HARQ timer may not have expired (e.g., there is time remaining on the DL HARQ timer), there is gNB processing delay, etc.

Figure 6:
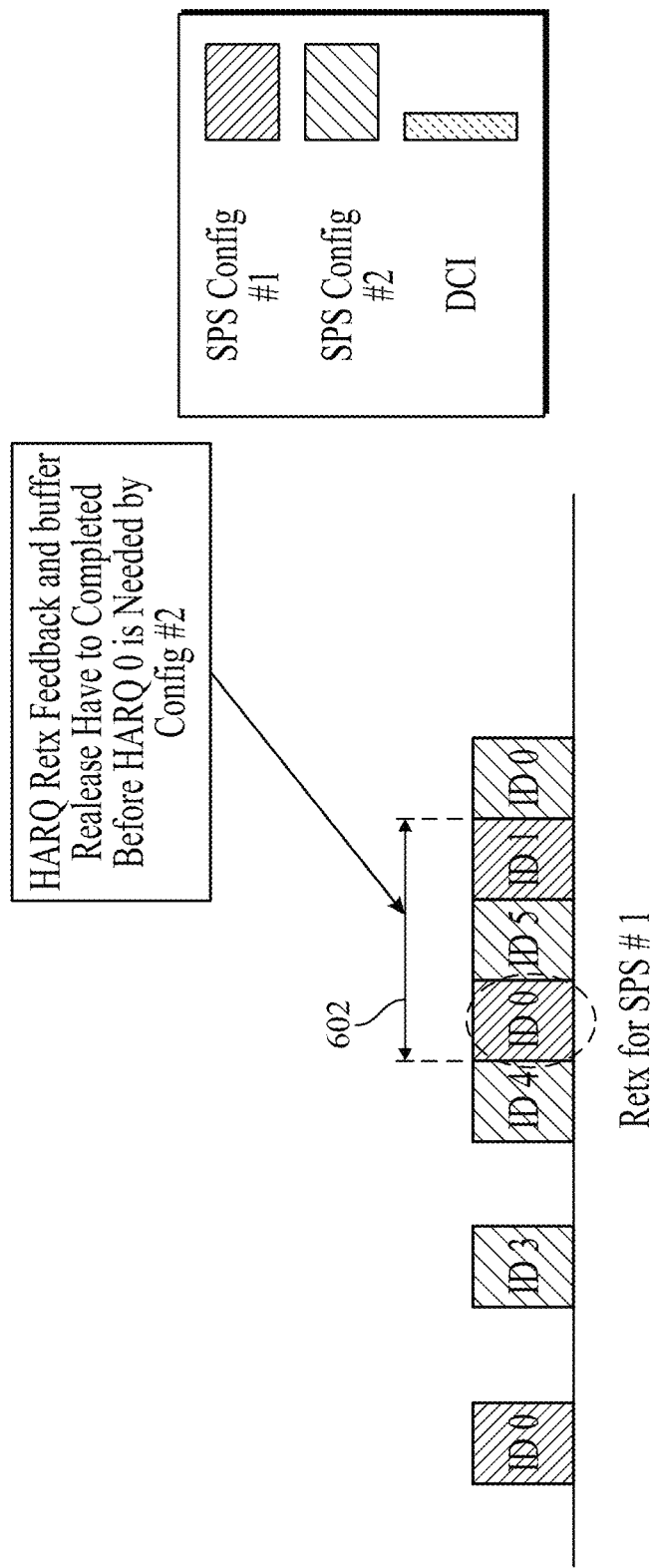
FIGS. 6-8 illustrate example scenarios for resolving a HARQ process ID conflict between multiple SPS configurations.

Conventional techniques that attempt to resolve this issue generally involve (1) retransmitting before the HARQ process ID collision, (2) using an overlapping dynamic grant, or (3) skipping the SPS occasion with the HARQ process ID collision. FIG. 6 illustrates an example scenario where the gNB retransmits the PDSCH for HARQ process ID 0 to avoid a conflict between SPS configuration #1 and SPS configuration #2 for HARQ process ID 0. In this instance, the collision may be avoided if the gNB retransmits data for HARQ process ID 0 and frees the buffer. However, in some cases, doing so may not be possible because of HARQ feedback and gNB processing timeline. For example, the HARQ retransmission feedback and buffer release may have to be completed (within the time frame 602) before HARQ process ID 0 is needed by SPS configuration #2.

Figure 7:
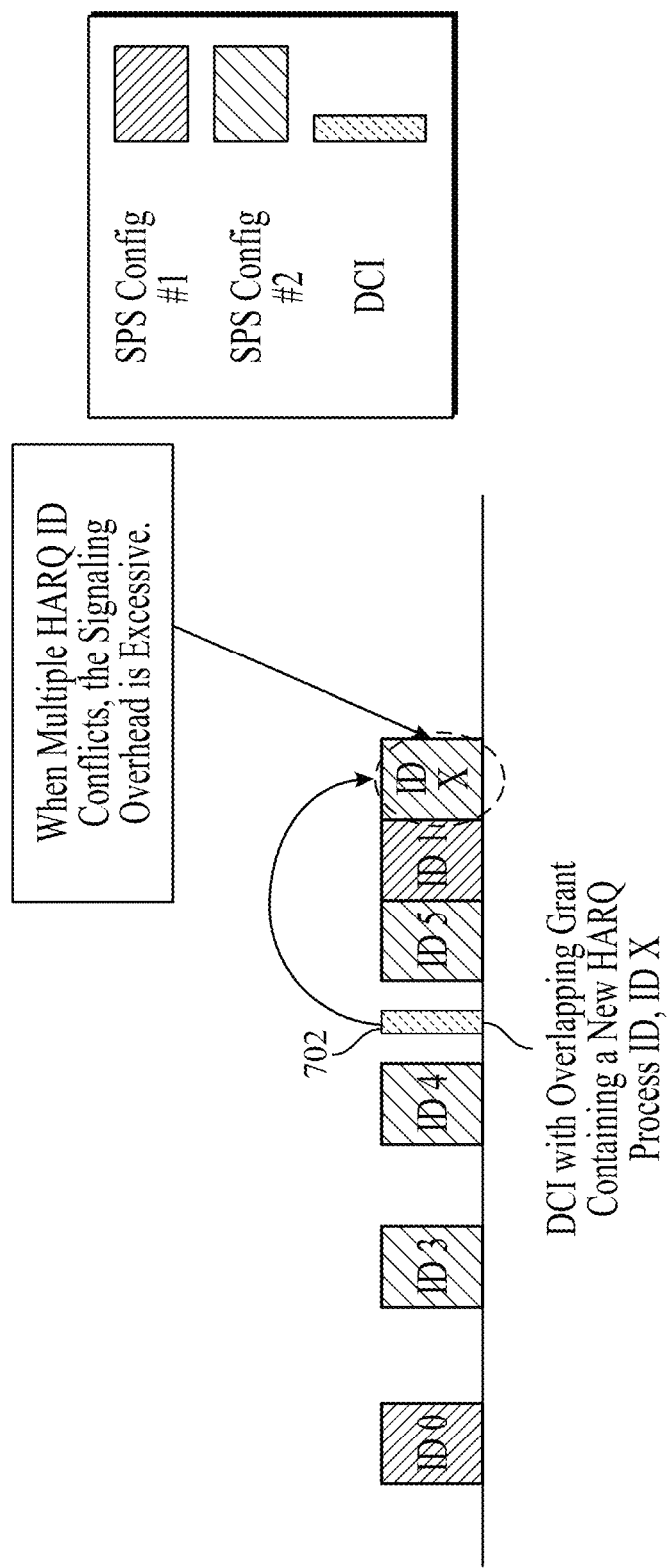

FIG. 7 illustrates an example scenario where the gNB uses a dynamic grant overlapping the SPS occasions to indicate a new HARQ process ID for the HARQ process ID in conflict. As shown, the gNB sends a DCI 702 that includes the HARQ process ID (e.g., HARQ process ID X) that the gNB wants to use to replace the HARQ ID in conflict (e.g., HARQ process ID 0). Using a dynamic grant that overlaps the SPS occasions to indicate a new HARQ process ID may lead to excessive signaling overhead, e.g., in cases with multiple HARQ ID conflicts. Additionally, the dynamic grant may include a large amount of information, e.g., control information (PDCCH) and data payload (PDSCH), etc., that may this approach infeasible for a large amount of conflicts.

Figure 8:
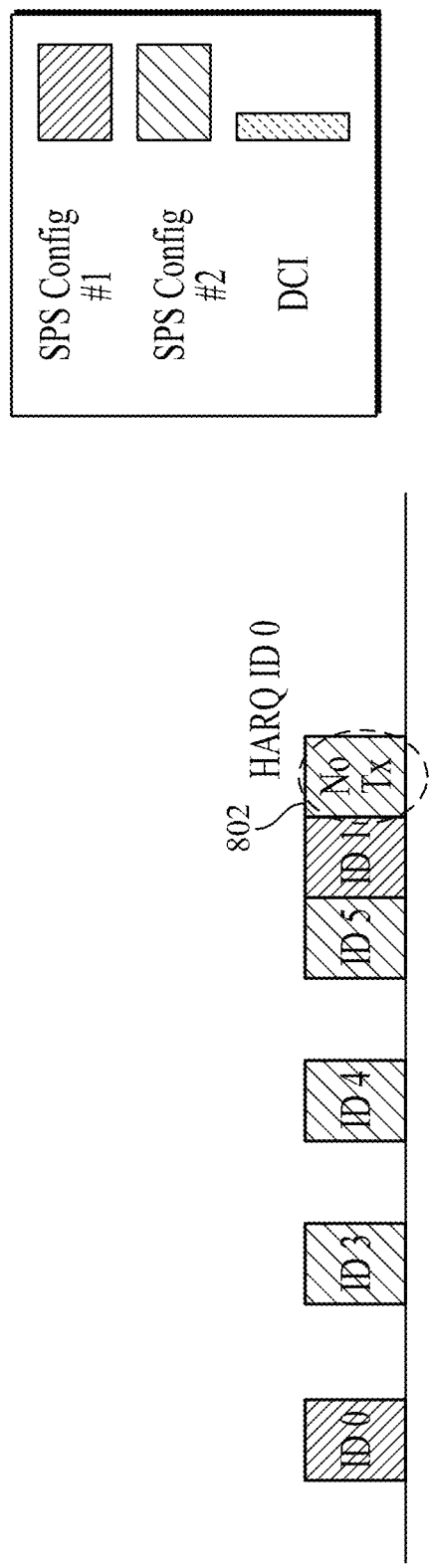

FIG. 8 illustrates an example scenario where the gNB chooses to avoid transmitting on the SPS occasion 802 with the HARQ process ID collision and reuse the resource. In this scenario, however, the UE may still assume that the gNB is sending a transmission during SPS occasion 802 (e.g., the UE may not be aware of the gNB choosing to avoid the transmission). This, in turn, can corrupt the UE's HARQ buffer with garbage data, causing a performance impact from the UE combining data across SPS configurations.

Accordingly, it may be desirable to provide improved techniques and apparatus for HARQ process ID assignment for multiple SPS configurations sharing the same HARQ process pool to avoid conflicts between the multiple SPS configurations.

Example DCI-Based HARQ ID Sharing for Multiple SPS Configurations

Aspects of the present disclosure provide rule-based techniques for avoiding HARQ process ID conflicts in scenarios where multiple SPS configurations share the same pool of HARQ process IDs. Compared to conventional techniques described above, the rule-based techniques described herein may involve limited signaling (or, in some cases, no signaling) in the HARQ process ID assignment. Because of the limited signaling (or no signaling), the latency associated with the signaling may also be avoided.

In some aspects, the gNB and/or UE may assign one or more HARQ process IDs to SPS occasions across one or more SPS configurations, using one or more predetermined rules. In one aspect, the one or more predetermined rules may be used in response to detecting one or more SPS occasions that have HARQ process ID collisions (or conflicts).

Figure 9:
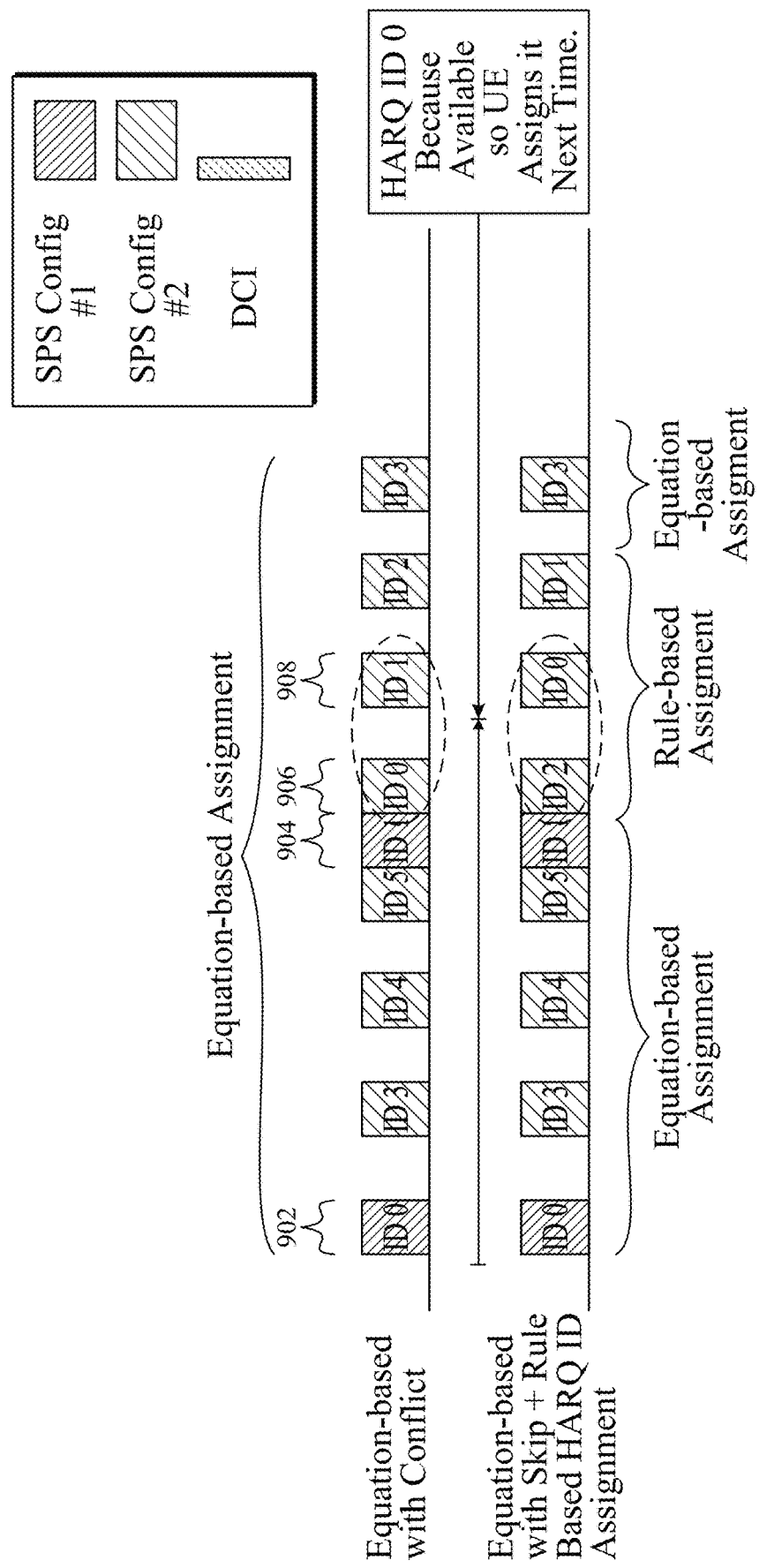
FIGS. 9-10 illustrate examples of using predetermined rule(s) to avoid a HARQ process ID conflict between multiple SPS configurations, in accordance with certain aspects of the present disclosure.

FIG. 9 illustrates an example of a rule-based HARQ process ID assignment, in accordance with certain aspects of the present disclosure. Note that while FIG. 9 depicts a scenario where a rule-based HARQ process ID assignment is used in combination with an equation-based HARQ process ID assignment, aspects presented herein allow for gNBs and/or UEs to use a rule-based HARQ process solely or combine the rule-based HARQ process ID assignment with the equation-based HARQ process ID assignment. For example, in some aspects, the gNB and/or UE may determine to apply the rule-based HARQ process ID assignment when certain conditions are met (e.g., one or more HARQ ID conflicts are detected).

In this case, as shown in FIG. 9, the gNB and UE detect a HARQ process ID conflict for SPS occasions 906 and 908. In particular, the HARQ process ID for SPS occasion 906 (of SPS configuration #2) conflicts with the HARQ process ID for SPS occasion 902 (of SPS configuration #1). Similarly, the HARQ process ID for SPS occasion 908 (of SPS configuration #2) conflicts with the HARQ process ID for SPS occasion 904 (of SPS configuration #1). After detecting the HARQ process ID conflicts for SPS occasions 906 and 908, the gNB and UE switch to using a rule-based HARQ process ID assignment, in which a HARQ process ID=2 is assigned to SPS occasion 906 and a HARQ process ID=0 is assigned to SPS occasion 908.

In some aspects, the gNB and/or UE may detect HARQ process ID conflict(s) based on knowledge of the HARQ feedback and gNB processing timeline. In one example, if the UE and/or gNB know that HARQ feedback for a previous HARQ process has not been sent, the UE and/or gNB may detect that there is a HARQ process ID conflict. In another example, if the UE and/or gNB know the gNB HARQ time, the UE and/or gNB can predict whether a previous HARQ process can be processed by the gNB. In this case, the UE and/or gNB can detect a HARQ process ID conflict based on the prediction. In some aspects, if ambiguity regarding whether a HARQ process ID conflict exists is still present, the gNB can send a skip DCI (with minimal signaling overhead) to the UE indicating the conflict. In some cases, the skip DCI can be piggybacked (e.g., multiplexed with data) on a preceding SPS occasion.

In response to detecting a conflict, the gNB and/or UE can replace the HARQ process ID using one or more predetermined rules between the gNB and UE. The predetermined rules may indicate a selection criteria for choosing a new HARQ process ID. For example, the predetermined rules may indicate to select the lowest available HARQ process ID from the HARQ ID pool. In some cases, the predetermined rules may indicate to select the highest available HARQ process ID from the HARQ ID pool. In some cases, the predetermined rules may indicate to select based on another criteria (e.g., current and future availabilities of HARQ processes, as opposed to solely based on the current availability).

In some aspects, if the gNB and/or UE detect one or more conflicts in k (consecutive) SPS occasions, the UE and/or gNB may determine (based on the rules) to switch to using the rule-based HARQ process ID assignment. In some cases, the gNB and/or UE may switch to the rule-based HARQ process ID assignment for a predetermined amount of time (or duration). After the duration, the gNB and/or UE may switch back to using an equation-based HARQ process ID assignment.

In some aspects, in the UCI feedback, the HARQ process ID can be included and can be used to periodically sync the gNB and the UE. In some cases, the UCI feedback may also include the indication of the SPS configurations and the SPS occasions. In some aspects, after reverting back to an equation-based HARQ process ID assignment (e.g., after the predetermined duration), the gNB and/or UE may reset and re-sync the HARQ process ID assignment. The condition for reset may be activation of a SPS configuration, re-configuration of a SPS configuration, or deactivation of a SPS configuration.

In some aspects, the gNB and/or UE may skip assigning one or more HARQ process IDs to SPS occasions across one or more SPS configurations, using one or more predetermined rules. In one aspect, the one or more predetermined rules may be used in response to detecting one or more SPS occasions that have HARQ process ID collisions (or conflicts).

Figure 10:
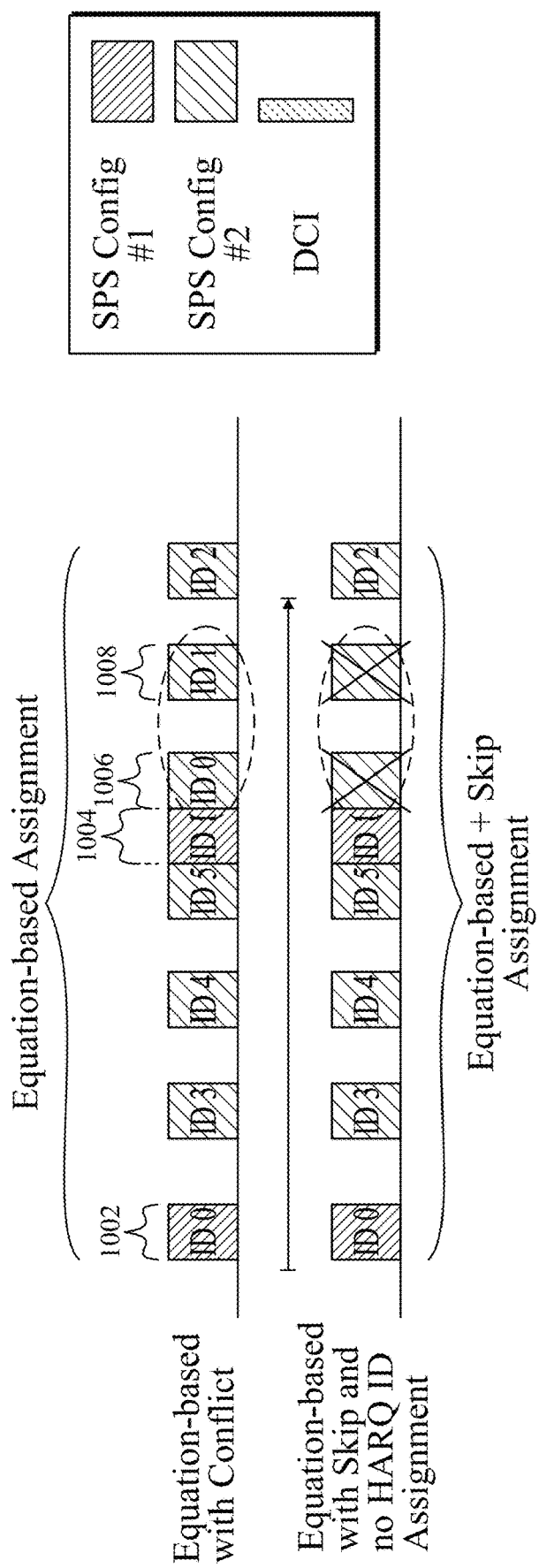

FIG. 10 illustrates an example of a rule-based HARQ process ID assignment, in accordance with certain aspects of the present disclosure. As shown in FIG. 10, the gNB and UE detect a HARQ process ID conflict for SPS occasions 1006 and 1008. In particular, the HARQ process ID for SPS occasion 1006 (of SPS configuration #2) conflicts with the HARQ process ID for SPS occasion 1002 (of SPS configuration #1). Similarly, the HARQ process ID for SPS occasion 1008 (of SPS configuration #2) conflicts with the HARQ process ID for SPS occasion 1004 (of SPS configuration #1). After detecting the HARQ process ID conflicts for SPS occasions 1006 and 1008, the gNB and UE switch to using a rule-based HARQ process ID assignment, in which assignment of a HARQ process ID for SPS occasions 1006 and 1008 in addition to SPS occasions 1006 and 1008 are skipped. The gNB, for example, may refrain from transmitting a PDSCH in SPS occasions 1006 and 1008.

Similarly, the UE may refrain from monitoring for a PDSCH in SPS occasions 1006 and 1008.

Similar to FIG. 9, in FIG. 10, the gNB and/or UE may detect that there is a HARQ process ID conflict based on HARQ feedback and/or the gNB processing timeline. For example, if the UE knows that the HARQ feedback for a previous HARQ process has not been sent, the UE may skip the HARQ process ID. The gNB may also skip the HARQ process ID pending HARQ feedback reception. If the UE and/or gNB have knowledge of the gNB HARQ processing timeline, the UE and/or gNB can predict whether a previous HARQ process has been process by the gNB and can detect a conflict based on the prediction. If a conflict is detected, the UE and gNB may skip the HARQ process ID assignment (keeping the old data in its respective buffer).

Figure 11:
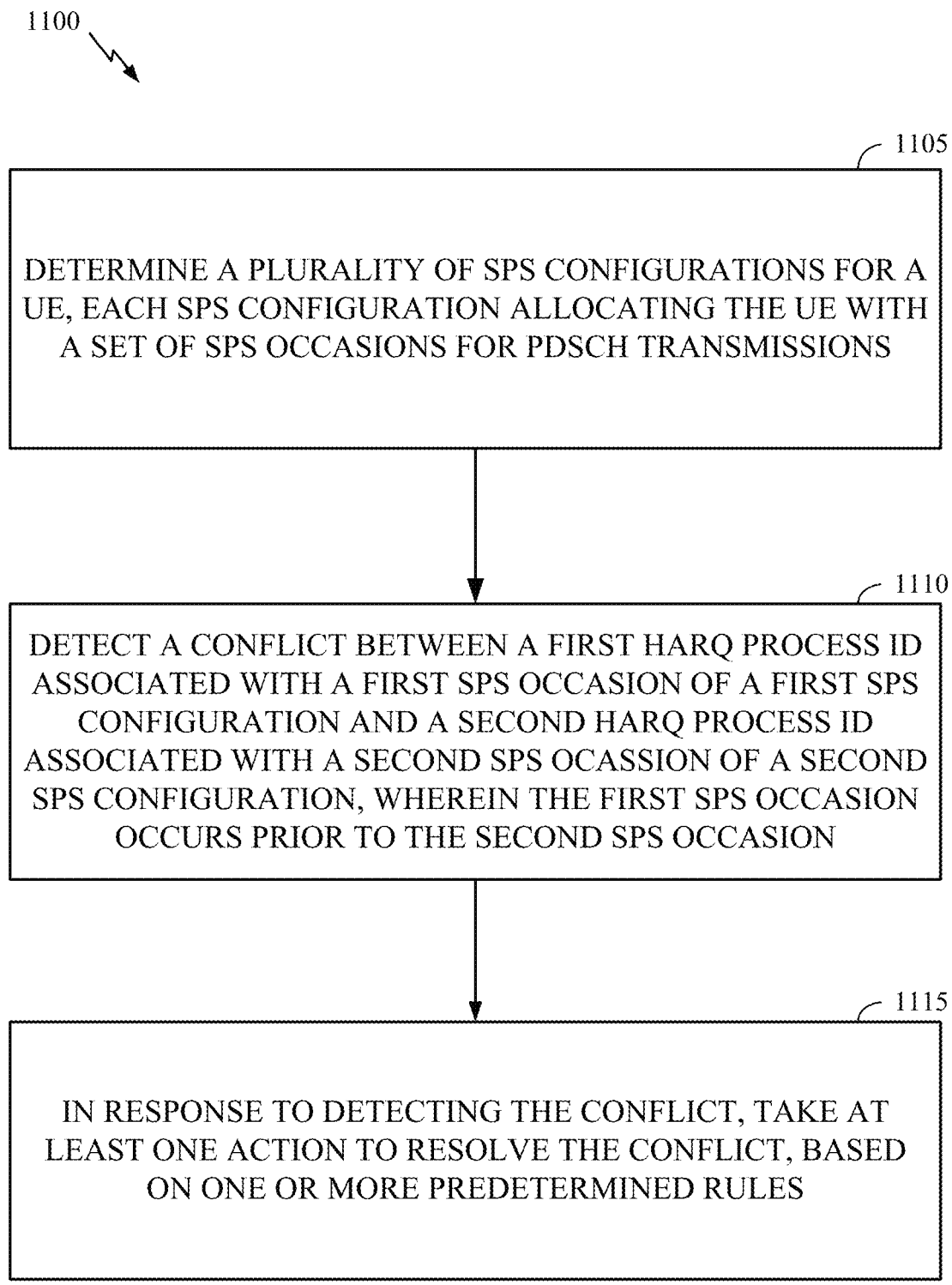
FIG. 11 is a flow diagram illustrating example operations for wireless communication by a network entity, in accordance with certain aspects of the present disclosure.

FIG. 11 is a flow diagram illustrating example operations 1100 for wireless communication, in accordance with certain aspects of the present disclosure. The operations 1100 may be performed, for example, by a network entity (e.g., gNB, such as the BS 110a in the wireless communication network 100). The operations 1100 may be complimentary operations by the network entity to the operations 1200 performed by the UE. Operations 1100 may be implemented as software components that are executed and run on one or more processors (e.g., controller/processor 240 of FIG. 2). Further, the transmission and reception of signals by the network entity in operations 1100 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1100 may begin, at 1105, where the network entity determines a plurality of SPS configurations (e.g., SPS configuration #1, SPS configuration #2) for a UE. Each SPS configuration allocates the UE with a set of (periodic) SPS occasions for PDSCH transmissions. At 1110, the network entity detects a conflict between a first HARQ process ID associated with a first SPS occasion (e.g., SPS occasion 906) of a first of the plurality of SPS configurations (e.g., SPS configuration #1) and a second HARQ process ID associated with a second SPS occasion (e.g., SPS occasion 902) of a second of the plurality of SPS configurations (e.g., SPS configuration #2), wherein the first SPS occasion occurs prior to the second SPS occasion. At 1115, the network entity takes at least one action to resolve the conflict, based on one or more rules, in response to detecting the conflict.

In some aspects, detecting the conflict (at 1110) may include determining that the first HARQ process ID associated with the first SPS occasion and the second HARQ process ID associated with the second SPS occasion are the same. In some aspects, detecting the conflict (at 1110) may further include determining that the first HARQ process ID associated with the first SPS occasion has not been released within a threshold amount of time of an occurrence of the second SPS occasion. For example, the network entity may determine that HARQ feedback for the first SPS occasion has not been sent. In another example, the network entity may determine that a previous HARQ process (using the first HARQ process ID) has not been processed, based on knowledge of a HARQ processing timeline.

In some aspects, taking the at least one action (at 1115) may include replacing the second HARQ process ID associated with the second SPS occasion with a third HARQ process ID. In one aspect, the network entity may replace the second HARQ process ID by determining the third HARQ process ID from a plurality of HARQ process IDs (shared by the plurality of SPS configurations), based on the one or more rules. In some aspects, the one or more rules may indicate a selection criteria for selecting the third HARQ process ID from the plurality of HARQ process IDs.

In some aspects, the second HARQ process ID may be determined using an equation-based HARQ process ID assignment (e.g., using Equation 1). That is, the second HARQ process ID may be determined based on at least one of a periodicity of the second SPS configuration, a number of HARQ process IDs shared by the plurality of SPS configurations, or a HARQ process ID offset configured for the second SPS configuration.

In some aspects, the operation 1100 may further include determining a number of conflicts that occur prior to an occurrence of the second SPS occasion. In this case, the taking the at least one action (at 1115) may further include, for a predetermined amount of time, refraining from using the equation-based HARQ process ID assignment, when the number of conflicts exceeds a threshold number of conflicts. After the predetermined amount of time has elapsed, taking the at least one action may further include switching back to the rule-based HARQ process ID assignment. The one or more rules may indicate at least one of the threshold number of conflicts or the predetermined amount of time.

In some aspects, taking the at least one action may include at least one of: (i) refraining from assigning a HARQ process ID to the second SPS occasion, or (ii) refraining from transmitting a PDSCH during the second SPS occasion.

Figure 12:
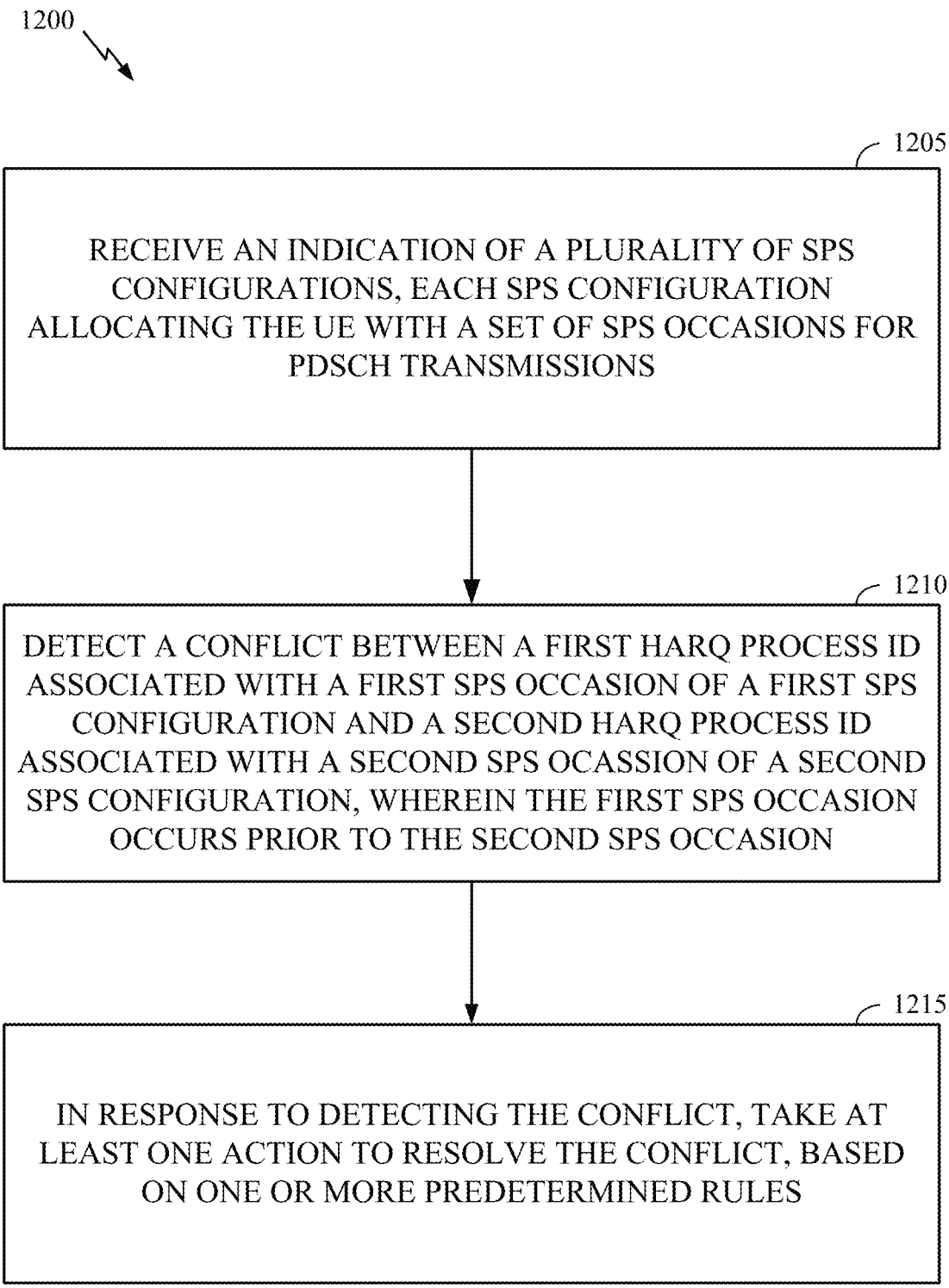
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by UE (e.g., such as a UE 120a in the wireless communication network 100). The operations 1200 may be complimentary operations by the UE to the operations 1100 performed by the network entity. Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1205, where the UE receives an indication of a plurality of SPS configurations (e.g., SPS configuration #1, SPS configuration #2). Each SPS configuration allocates the UE with a set of SPS occasions for PDSCH transmissions. At 1210, the UE detects a conflict between a first HARQ process ID associated with a first SPS occasion (e.g., SPS occasion 906) of a first of the plurality of SPS configurations (e.g., SPS configuration #1) and a second HARQ process ID associated with a second SPS occasion (e.g., SPS occasion 902) of a second of the plurality of SPS configurations (e.g., SPS configuration #2), wherein the first SPS occasion occurs prior to the second SPS occasion. At 1215, the UE takes at least one action to resolve the conflict, based on one or more rules, in response to detecting the conflict.

In some aspects, detecting the conflict (at 1210) may include determining that the first HARQ process ID associated with the first SPS occasion and the second HARQ process ID associated with the second SPS occasion are the same. In some aspects, detecting the conflict (at 1210) may further include determining that the first HARQ process ID associated with the first SPS occasion has not been released within a threshold amount of time of an occurrence of the second SPS occasion. For example, the UE may determine that HARQ feedback for the first SPS occasion has not been sent. In another example, the UE may determine that a previous HARQ process (using the first HARQ process ID) has not been processed, based on knowledge of a HARQ processing timeline.

In some aspects, taking the at least one action (at 1215) may include replacing the second HARQ process ID associated with the second SPS occasion with a third HARQ process ID. In one aspect, the UE may replace the second HARQ process ID by determining the third HARQ process ID from a plurality of HARQ process IDs (shared by the plurality of SPS configurations), based on the one or more rules. In some aspects, the one or more rules may indicate a selection criteria for selecting the third HARQ process ID from the plurality of HARQ process IDs.

In some aspects, the second HARQ process ID may be determined using an equation-based HARQ process ID assignment (e.g., using Equation 1). That is, the second HARQ process ID may be determined based on at least one of a periodicity of the second SPS configuration, a number of HARQ process IDs shared by the plurality of SPS configurations, or a HARQ process ID offset configured for the second SPS configuration.

In some aspects, the operation 1200 may further include determining a number of conflicts that occur prior to an occurrence of the second SPS occasion. In this case, the taking the at least one action (at 1215) may further include, for a predetermined amount of time, refraining from using the equation-based HARQ process ID assignment, when the number of conflicts exceeds a threshold number of conflicts. After the predetermined amount of time has elapsed, taking the at least one action may further include switching back to the rule-based HARQ process ID assignment. The one or more rules may indicate at least one of the threshold number of conflicts or the predetermined amount of time.

In some aspects, taking the at least one action may include at least one of: (i) refraining from assigning a HARQ process ID to the second SPS occasion, or (ii) refraining from monitoring for a PDSCH during the second SPS occasion.

Figure 13:
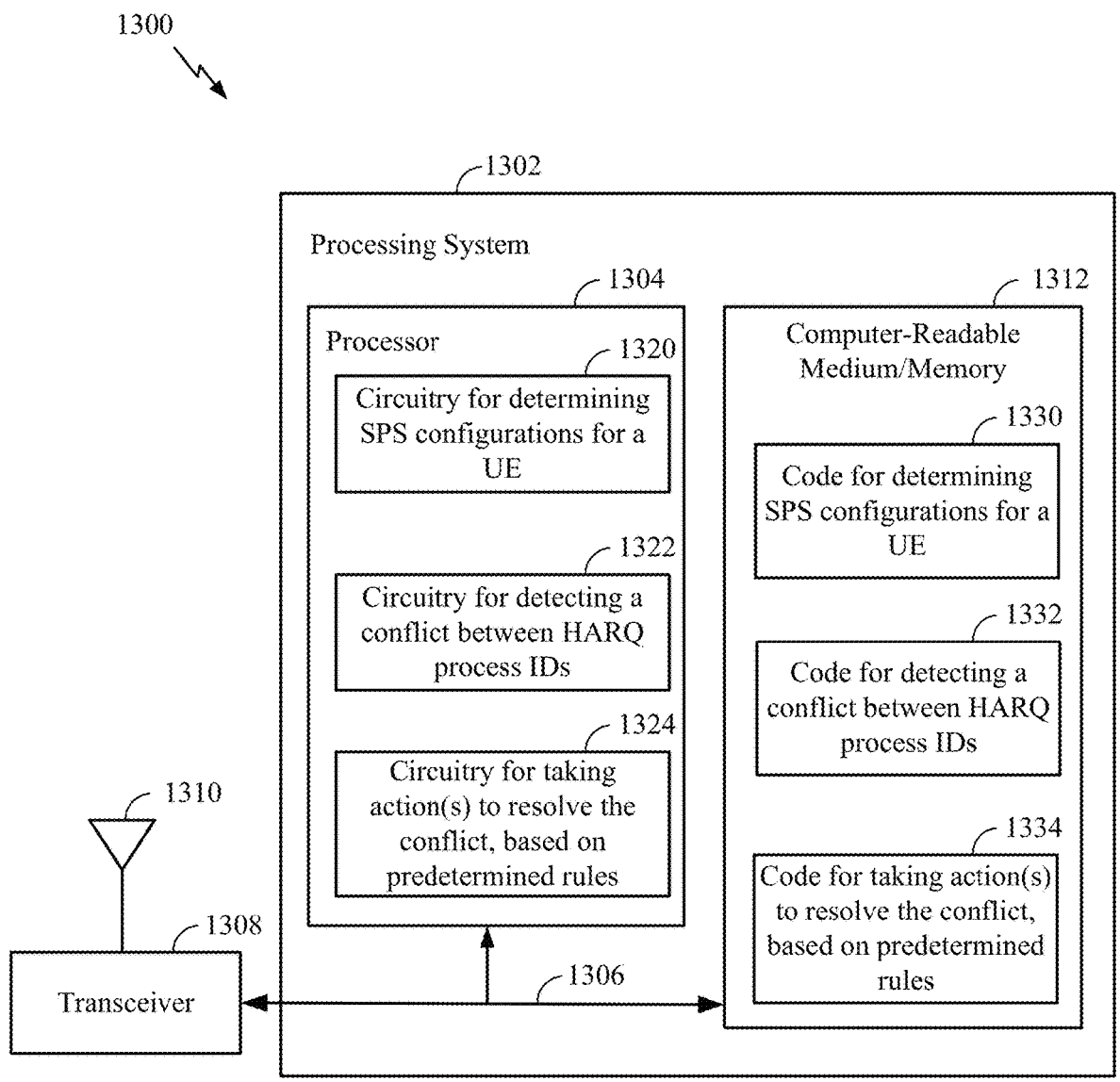
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 9-11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein. In certain aspects, computer-readable medium/memory 1312 stores code 1330 for determining a plurality of SPS configurations for a UE, each SPS configuration allocating the UE with a set of SPS occasions for PDSCH transmissions; code 1332 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and code 1334 for, in response to detecting the conflict, taking at least one action to resolve the conflict, based on one or more predetermined rules.

In certain aspects, the processor 1304 has circuitry configured to implement the code stored in the computer-readable medium/memory 1312. The processor 1304 includes circuitry 1320 for determining a plurality of SPS configurations for a UE, each SPS configuration allocating the UE with a set of SPS occasions for PDSCH transmissions; circuitry 1322 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and circuitry 1324 for, in response to detecting the conflict, taking at least one action to resolve the conflict, based on one or more predetermined rules.

Figure 14:
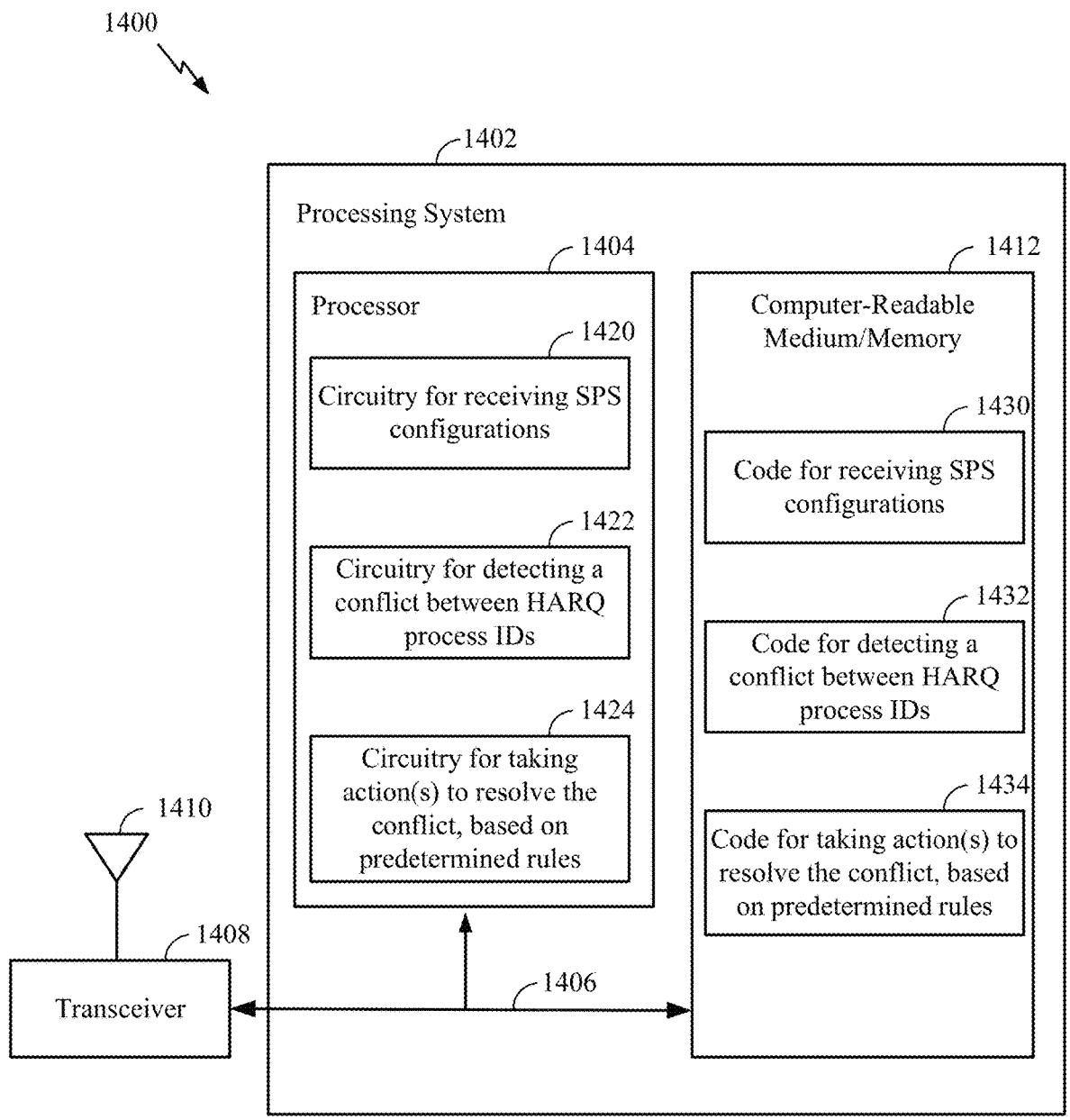
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIGS. 9-10, and 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein. In certain aspects, computer-readable medium/memory 1412 stores code 1430 for receiving an indication of a plurality of SPS configurations for the UE, each SPS configuration allocating the UE with a set of SPS occasions for PDSCH transmissions; code 1432 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and code 1434 for, in response to detecting the conflict, taking at least one action to resolve the conflict, based on one or more predetermined rules.

In certain aspects, the processor 1404 has circuitry configured to implement the code stored in the computer-readable medium/memory 1412. The processor 1404 includes circuitry 1420 for receiving an indication of a plurality of SPS configurations for the UE, each SPS configuration allocating the UE with a set of SPS occasions for PDSCH transmissions; circuitry 1422 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and circuitry 1424 for, in response to detecting the conflict, taking at least one action to resolve the conflict, based on one or more predetermined rules.

Example Clauses

Implementation examples are described in the following numbered clauses:

Clause 1: A method for wireless communication by a network entity, comprising: determining a plurality of SPS configurations for a UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, taking at least one action to resolve the conflict, based on one or more predetermined rules.

Clause 2: The method according to clause 1, wherein detecting the conflict comprises determining that the first HARQ process ID associated with the first SPS occasion and the second HARQ process ID associated with the second SPS occasion are the same, based on a HARQ ID computed from a function of the respective SPS configuration and one or more parameters.

Clause 3: The method according to any of clauses 1-2, wherein detecting the conflict further comprises determining that the first HARQ process ID associated with the first SPS occasion has not been released within a threshold amount of time of an occurrence of the second SPS occasion.

Clause 4: The method according to any of clauses 1-3, wherein taking the at least one action to resolve the conflict comprises replacing the second HARQ process ID associated with the second SPS occasion with a third HARQ process ID, based on the one or more predetermined rules.

Clause 5: The method according to clause 4, wherein replacing the second HARQ process ID comprises determining the third HARQ process ID from a plurality of HARQ process IDs, based on the one or more predetermined rules.

Clause 6: The method according to clause 5, wherein the plurality of HARQ process IDs are shared by the plurality of SPS configurations.

Clause 7: The method according to any of clauses 5-6, wherein the one or more predetermined rules indicate a selection criteria for selecting the third HARQ process ID from the plurality of HARQ process IDs.

Clause 8: The method according to clause 7, wherein the selection criteria comprises selecting a lowest available HARQ process ID from the plurality of HARQ process IDs.

Clause 9: The method according to clause 7, wherein the selection criteria comprises selecting a highest available HARQ process ID from the plurality of HARQ process IDs.

Clause 10: The method according to clause 7, wherein the selection criteria comprises selecting a HARQ process ID based on at least one of a current availability of the HARQ process ID or a future availability of the HARQ process ID.

Clause 11: The method according to any of clauses 1-10, wherein the second HARQ process ID is determined based on at least one of a periodicity of the second SPS configuration, a number of HARQ process IDs shared by the plurality of SPS configurations, or a HARQ process ID offset configured for the second SPS configuration.

Clause 12: The method according to any of clauses 1-3, further comprising determining a number of conflicts that occur prior to an occurrence of the second SPS occasion.

Clause 13: The method according to clause 12, wherein taking the at least one action further comprises, for a predetermined amount of time, refraining from determining at least one third HARQ process ID of the second SPS configuration, based on a function of the second SPS configuration and one or more parameters.

Clause 14: The method according to clause 13, wherein the function is based on at least one of the periodicity of the second SPS configuration, the number of HARQ process IDs shared by the plurality of SPS configurations, or the HARQ process ID offset configured for the second SPS configuration, when the number of conflicts exceeds a threshold number of conflicts.

Clause 15: The method according to any of clauses 13-14, wherein taking the at least one action further comprises, after the predetermined amount of time has elapsed, determining at least one fourth HARQ process ID of the second SPS configuration, based on the function of the second SPS configuration and the one or more parameters.

Clause 16: The method according to clause 15, wherein the at least one fourth HARQ process ID is determined based on the function after further determining that one or more conditions are satisfied.

Clause 17: The method according to clause 16, wherein the one or more conditions comprises at least one of: activation of a SPS configuration, re-configuration of a SPS configuration, or deactivation of a SPS configuration.

Clause 18: The method according to any of clauses 13-17, wherein the one or more predetermined rules further indicate at least one of the threshold number of conflicts or the predetermined amount of time.

Clause 19: The method according to any of clauses 1-18, wherein taking the at least one action further comprises receiving HARQ feedback for at least a third SPS occasion of one of the plurality of SPS configurations, wherein the HARQ feedback comprises an indication of at least one of a HARQ process ID for the third SPS occasion, the SPS configuration associated with the third SPS occasion, or the third SPS occasion.

Clause 20: The method according to any of clauses 1-3, wherein taking the at least one action to resolve the conflict comprises refraining from assigning a HARQ process ID to the second SPS occasion, based on the one or more predetermined rules.

Clause 21: The method according to any of clauses 1-20, wherein taking the at least one action to resolve the conflict comprises at least one of: refraining from transmitting a PDSCH to the UE during the second SPS occasion; or transmitting a PDSCH to another UE during the second SPS occasion.

Clause 22: A method for wireless communication by a UE, comprising: receiving an indication of a plurality of SPS configurations for a UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, taking at least one action to resolve the conflict, based on one or more predetermined rules.

Clause 23: The method according to clause 22, wherein detecting the conflict comprises determining that the first HARQ process ID associated with the first SPS occasion and the second HARQ process ID associated with the second SPS occasion are the same, based on a HARQ ID computed from a function of the respective SPS configuration and one or more parameters.

Clause 24: The method according to any of clauses 22-23, wherein detecting the conflict further comprises determining that the first HARQ process ID associated with the first SPS occasion has not been released within a threshold amount of time of an occurrence of the second SPS occasion.

Clause 25: The method according to clause 24, wherein determining that the first HARQ process ID associated with the first SPS occasion has not been released comprises determining that HARQ feedback for the first HARQ process ID has not been transmitted within the threshold amount of time.

Clause 26: The method according to clause 24, wherein determining that the first HARQ process ID associated with the first SPS occasion has not been released comprises determining, based on knowledge of a HARQ processing timeline, that the first HARQ process ID has not been processed within the threshold amount of time.

Clause 27: The method according to any of clauses 22-26, wherein taking the at least one action to resolve the conflict comprises replacing the second HARQ process ID associated with the second SPS occasion with a third HARQ process ID, based on the one or more predetermined rules.

Clause 28: The method according to clause 27, wherein replacing the second HARQ process ID comprises determining the third HARQ process ID from a plurality of HARQ process IDs, based on the one or more predetermined rules.

Clause 29: The method according to clause 28, wherein the plurality of HARQ process IDs are shared by the plurality of SPS configurations.

Clause 30: The method according to any of clauses 28-29, wherein the one or more predetermined rules indicate a selection criteria for selecting the third HARQ process ID from the plurality of HARQ process IDs.

Clause 31: The method according to clause 30, wherein the selection criteria comprises selecting a lowest available HARQ process ID from the plurality of HARQ process IDs.

Clause 32: The method according to clause 30, wherein the selection criteria comprises selecting a highest available HARQ process ID from the plurality of HARQ process IDs.

Clause 33: The method according to clause 30, wherein the selection criteria comprises selecting a HARQ process ID based on at least one of a current availability of the HARQ process ID or a future availability of the HARQ process ID.

Clause 34: The method according to any of clauses 22-33, wherein the second HARQ process ID is determined based on at least one of a periodicity of the second SPS configuration, a number of HARQ process IDs shared by the plurality of SPS configurations, or a HARQ process ID offset configured for the second SPS configuration.

Clause 35: The method according to any of clauses 22-26, further comprising determining a number of conflicts that occur prior to an occurrence of the second SPS occasion.

Clause 36: The method according to clause 35, wherein taking the at least one action further comprises, for a predetermined amount of time, refraining from determining at least one third HARQ process ID of the second SPS configuration, based on a function of the second SPS configuration and one or more parameters.

Clause 37: The method according to clause 36, wherein the function is based on at least one of the periodicity of the second SPS configuration, the number of HARQ process IDs shared by the plurality of SPS configurations, or the HARQ process ID offset configured for the second SPS configuration, when the number of conflicts exceeds a threshold number of conflicts.

Clause 38: The method according to any of clauses 36-37, wherein taking the at least one action further comprises, after the predetermined amount of time has elapsed, determining at least one fourth HARQ process ID of the second SPS configuration, based on the function of the second SPS configuration and the one or more parameters.

Clause 39: The method according to clause 38, wherein the at least one fourth HARQ process ID is determined based on the function after further determining that one or more conditions are satisfied.

Clause 40: The method according to clause 39, wherein the one or more conditions comprises at least one of: activation of a SPS configuration, re-configuration of a SPS configuration, or deactivation of a SPS configuration.

Clause 41: The method according to any of clauses 36-40, wherein the one or more predetermined rules further indicate at least one of the threshold number of conflicts or the predetermined amount of time.

Clause 42: The method according to any of clauses 22-41, wherein taking the at least one action further comprises transmitting HARQ feedback for at least a third SPS occasion of one of the plurality of SPS configurations, wherein the HARQ feedback comprises an indication of at least one of a HARQ process ID for the third SPS occasion, the SPS configuration associated with the third SPS occasion, or the third SPS occasion.

Clause 43: The method according to any of clauses 22-26, wherein taking the at least one action comprises refraining from assigning a HARQ process ID to the second SPS occasion.

Clause 44: The method according to any of clauses 22-43, wherein taking the at least one action comprises refraining from monitoring for a PDSCH during the second SPS occasion.

Clause 45: A method for wireless communication by a UE, comprising: receiving an indication of a plurality of SPS configurations for the UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, taking at least one action to resolve the conflict, based on one or more predetermined rules.

Clause 46: The method according to clause 45, wherein detecting the conflict comprises: determining that the first HARQ process ID associated with the first SPS occasion and the second HARQ process ID associated with the second SPS occasion are the same, based on a HARQ ID computed from a function of a respective SPS configuration and one or more parameters; and determining that the first HARQ process ID associated with the first SPS occasion has not been released within a threshold amount of time of an occurrence of the second SPS occasion.

Clause 47: The method according to clause 46, wherein determining that the first HARQ process ID associated with the first SPS occasion has not been released comprises: determining that HARQ feedback for the first HARQ process ID has not been transmitted within the threshold amount of time; or determining, based on knowledge of a HARQ processing timeline, that the first HARQ process ID has not been processed within the threshold amount of time.

Clause 48: The method according to clause 45, wherein taking the at least one action to resolve the conflict comprises replacing the second HARQ process ID associated with the second SPS occasion with a third HARQ process ID, based on the one or more predetermined rules.

Clause 49: The method according to clause 48, wherein replacing the second HARQ process ID comprises determining the third HARQ process ID from a plurality of HARQ process IDs shared by the plurality of SPS configurations, based on the one or more predetermined rules.

Clause 50: The method according to clause 49, wherein: the one or more predetermined rules indicate a selection criteria for selecting the third HARQ process ID from the plurality of HARQ process IDs; and the selection criteria comprises: selecting a lowest available HARQ process ID from the plurality of HARQ process IDs; selecting a highest available HARQ process ID from the plurality of HARQ process IDs; or selecting a HARQ process ID based on at least one of a current availability of the HARQ process ID or a future availability of the HARQ process ID.

Clause 51: The method according to clause 45, wherein taking the at least one action comprises: determining a number of conflicts that occur prior to an occurrence of the second SPS occasion; and when the number of conflicts exceeds a threshold number of conflicts, refraining from determining at least one third HARQ process ID of the second SPS configuration, based on a function of the second SPS configuration and one or more parameters, for a predetermined amount of time.

Clause 52: The method according to clause 51, wherein taking the at least one action further comprises, during the predetermined amount of time, determining the at least one third HARQ process ID of the second SPS configuration, based on the one or more predetermined rules.

Clause 53: The method according to clause 51, wherein taking the at least one action further comprises, after the predetermined amount of time has elapsed, determining at least one fourth HARQ process ID of the second SPS configuration, based on the function of the second SPS configuration and the one or more parameters.

Clause 54: The method according to clause 53, wherein the at least one fourth HARQ process ID is determined based on the function after further determining that one or more conditions are satisfied.

Clause 55: The method according to clause 54, wherein the one or more conditions comprises at least one of: an activation of a SPS configuration, a re-configuration of a SPS configuration, or a deactivation of a SPS configuration.

Clause 56: The method according to clause 51, wherein the function is based on at least one of a periodicity of the second SPS configuration, a number of HARQ process IDs shared by the plurality of SPS configurations, or a HARQ process ID offset configured for the second SPS configuration.

Clause 57: The method according to clause 51, wherein the one or more predetermined rules indicate at least one of the threshold number of conflicts or the predetermined amount of time.

Clause 58: The method according to clause 45, wherein taking the at least one action comprises transmitting HARQ feedback for at least a third SPS occasion of one of the plurality of SPS configurations, wherein the HARQ feedback comprises an indication of at least one of a HARQ process ID for the third SPS occasion, the SPS configuration associated with the third SPS occasion, or the third SPS occasion.

Clause 59: The method according to clause 45, wherein taking the at least one action comprises refraining from assigning a HARQ process ID to the second SPS occasion.

Clause 60: The method according to clause 45, wherein taking the at least one action comprises refraining from monitoring for a PDSCH during the second SPS occasion.

Clause 61: The method according to clause 45, wherein the second HARQ process ID is determined based on at least one of a periodicity of the second SPS configuration, a number of HARQ process IDs shared by the plurality of SPS configurations, or a HARQ process ID offset configured for the second SPS configuration.

Clause 62: A method for wireless communication by a network entity, comprising: determining a plurality of SPS configurations for a UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, taking at least one action to resolve the conflict, based on one or more predetermined rules.

Clause 63: The method according to clause 62, wherein detecting the conflict comprises: determining that the first HARQ process ID associated with the first SPS occasion and the second HARQ process ID associated with the second SPS occasion are the same, based on a HARQ ID computed from a function of a respective SPS configuration and one or more parameters; and determining that the first HARQ process ID associated with the first SPS occasion has not been released within a threshold amount of time of an occurrence of the second SPS occasion.

Clause 64: The method according to clause 62, wherein taking the at least one action to resolve the conflict comprises replacing the second HARQ process ID associated with the second SPS occasion with a third HARQ process ID, based on the one or more predetermined rules.

Clause 65: The method according to clause 64, wherein: replacing the second HARQ process ID comprises determining, based on the one or more predetermined rules, the third HARQ process ID from a plurality of HARQ process IDs shared by the plurality of SPS configurations; and the one or more predetermined rules indicate a selection criteria for selecting the third HARQ process ID from the plurality of HARQ process IDs.

Clause 66: The method according to clause 65, wherein the selection criteria comprises: selecting a lowest available HARQ process ID from the plurality of HARQ process IDs; selecting a highest available HARQ process ID from the plurality of HARQ process IDs; or selecting a HARQ process ID based on at least one of a current availability of the HARQ process ID or a future availability of the HARQ process ID.

Clause 67: The method according to clause 62, wherein: taking the at least one action comprises: determining a number of conflicts that occur prior to an occurrence of the second SPS occasion; and when the number of conflicts exceeds a threshold number of conflicts, refraining from determining at least one third HARQ process ID of the second SPS configuration, based on a function of the second SPS configuration and one or more parameters, for a predetermined amount of time; and the function is based on at least one of a periodicity of the second SPS configuration, a number of HARQ process IDs shared by the plurality of SPS configurations, or a HARQ process ID offset configured for the second SPS configuration.

Clause 68: The method according to clause 67, wherein taking the at least one action further comprises, during the predetermined amount of time, determining the at least one third HARQ process ID of the second SPS configuration, based on the one or more predetermined rules.

Clause 69: The method according to clause 67, wherein: taking the at least one action further comprises, after the predetermined amount of time has elapsed, determining at least one fourth HARQ process ID of the second SPS configuration, based on the function of the SPS configuration and the one or more parameters; the at least one fourth HARQ process ID is determined based on the function after further determining at least one of: an activation of a SPS configuration, a re-configuration of a SPS configuration, or a deactivation of a SPS configuration.

Clause 70: The method according to clause 62, wherein: taking the at least one action comprises receiving HARQ feedback for at least a third SPS occasion of one of the plurality of SPS configurations; and the HARQ feedback comprises an indication of at least one of a HARQ process ID for the third SPS occasion, the SPS configuration associated with the third SPS occasion, or the third SPS occasion.

Clause 71: The method according to clause 62, wherein taking the at least one action to resolve the conflict comprises: refraining from assigning a HARQ process ID to the second SPS occasion, based on the one or more predetermined rules; or at least one of: refraining from transmitting a PDSCH to the UE during the second SPS occasion; or transmitting a PDSCH to another UE during the second SPS occasion.

Clause 72: The method according to clause 62, wherein the second HARQ process ID is determined based on at least one of a periodicity of the second SPS configuration, a number of HARQ process IDs shared by the plurality of SPS configurations, or a HARQ process ID offset configured for the second SPS configuration.

Clause 73: An apparatus comprising a processing system, a receiver, and a transmitter, the apparatus being configured to perform the method according to any of clauses 1-21 and 62-72.

Clause 74: An apparatus comprising a processing system, a receiver, and a transmitter, the apparatus being configured to perform the method according to any of clauses 22-61.

Clause 75: An apparatus comprising means for performing the method according to any of clauses 1-21 and 62-72.

Clause 76: An apparatus comprising means for performing the method according to any of clauses 22-61.

Clause 77: A non-transitory computer-readable medium comprising computer-executable instructions that, when executed by one or more processors of a processing system, cause a network entity to perform the method according to any of clauses 1-21 and 62-72.

Clause 78: A non-transitory computer-readable medium comprising computer-executable instructions that, when executed by one or more processors of a processing system, cause a UE to perform the method according to any of clauses 22-61.

Clause 79: A computer program product for wireless communication by a network entity embodied on a computer-readable storage medium, the computer-readable storage medium comprising code for performing the method according to any of clauses 1-21 and 62-72.

Clause 80: A computer program product for wireless communication by a UE embodied on a computer-readable storage medium, the computer-readable storage medium comprising code for performing the method according to any of clauses 22-61.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving an indication of a plurality of semi persistently scheduled (SPS) configurations for the UE, each SPS configuration allocating the UE with a set of SPS occasions for physical downlink shared channel (PDSCH) transmissions;
detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
in response to detecting the conflict, taking at least one action to resolve the conflict, based on one or more predetermined rules, wherein the one or more predetermined rules indicate a selection criteria for choosing a new HARQ process ID from a plurality of HARQ process IDs.

2. The method of claim 1, wherein detecting the conflict comprises:
- determining that the first HARQ process ID associated with the first SPS occasion and the second HARQ process ID associated with the second SPS occasion are the same, based on a HARQ ID computed from a function of a respective SPS configuration and one or more parameters; and
- determining that the first HARQ process ID associated with the first SPS occasion has not been released within a threshold amount of time of an occurrence of the second SPS occasion.

3. The method of claim 2, wherein determining that the first HARQ process ID associated with the first SPS occasion has not been released comprises:
- determining that HARQ feedback for the first HARQ process ID has not been transmitted within the threshold amount of time; or
- determining, based on knowledge of a HARQ processing timeline, that the first HARQ process ID has not been processed within the threshold amount of time.

4. The method of claim 1, wherein taking the at least one action to resolve the conflict comprises replacing the second HARQ process ID associated with the second SPS occasion with a third HARQ process ID, based on the one or more predetermined rules.

5. The method of claim 4, wherein replacing the second HARQ process ID comprises determining the third HARQ process ID from a plurality of HARQ process IDs shared by the plurality of SPS configurations, based on the one or more predetermined rules.

6. The method of claim 5, wherein:
- the one or more predetermined rules indicate a selection criteria for selecting the third HARQ process ID from the plurality of HARQ process IDs; and
- the selection criteria comprises:
  - selecting a lowest available HARQ process ID from the plurality of HARQ process IDs;
  - selecting a highest available HARQ process ID from the plurality of HARQ process IDs; or
  - selecting a HARQ process ID based on at least one of a current availability of the HARQ process ID or a future availability of the HARQ process ID.

7. The method of claim 1, wherein taking the at least one action comprises:
- determining a number of conflicts that occur prior to an occurrence of the second SPS occasion; and
- when the number of conflicts exceeds a threshold number of conflicts, refraining from determining at least one third HARQ process ID of the second SPS configuration, based on a function of the second SPS configuration and one or more parameters, for a predetermined amount of time.

8. The method of claim 7, wherein taking the at least one action further comprises, during the predetermined amount of time, determining the at least one third HARQ process ID of the second SPS configuration, based on the one or more predetermined rules.

9. The method of claim 7, wherein taking the at least one action further comprises, after the predetermined amount of time has elapsed, determining at least one fourth HARQ process ID of the second SPS configuration, based on the function of the second SPS configuration and the one or more parameters.

10. The method of claim 9, wherein the at least one fourth HARQ process ID is determined based on the function after further determining that one or more conditions are satisfied.

11. The method of claim 10, wherein the one or more conditions comprises at least one of: an activation of a SPS configuration, a re-configuration of a SPS configuration, or a deactivation of a SPS configuration.

12. The method of claim 7, wherein the function is based on at least one of a periodicity of the second SPS configuration, a number of HARQ process IDs shared by the plurality of SPS configurations, or a HARQ process ID offset configured for the second SPS configuration.

13. The method of claim 7, wherein the one or more predetermined rules indicate at least one of the threshold number of conflicts or the predetermined amount of time.

14. The method of claim 1, wherein taking the at least one action comprises transmitting HARQ feedback for at least a third SPS occasion of one of the plurality of SPS configurations, wherein the HARQ feedback comprises an indication of at least one of a HARQ process ID for the third SPS occasion, the SPS configuration associated with the third SPS occasion, or the third SPS occasion.

15. The method of claim 1, wherein taking the at least one action comprises refraining from assigning a HARQ process ID to the second SPS occasion.

16. The method of claim 1, wherein taking the at least one action comprises refraining from monitoring for a PDSCH during the second SPS occasion.

17. The method of claim 1, wherein the second HARQ process ID is determined based on at least one of a periodicity of the second SPS configuration, a number of HARQ process IDs shared by the plurality of SPS configurations, or a HARQ process ID offset configured for the second SPS configuration.

18. An apparatus for wireless communications, comprising:
- a receiver configured to receive an indication of a plurality of semi persistently scheduled (SPS) configurations for the apparatus, each SPS configuration allocating the apparatus with a set of SPS occasions for physical downlink shared channel (PDSCH) transmissions; and
- a processing system comprising:
  - a memory comprising computer-executable instructions; and
  - one or more processors configured to execute the computer-executable instructions and cause the processing system to:
    - detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
    - in response to detecting the conflict, take at least one action to resolve the conflict, based on one or more predetermined rules, wherein the one or more predetermined rules indicate a selection criteria for choosing a new HARQ process ID from a plurality of HARQ process IDs.

19. A method for wireless communication by a network entity, comprising:
- determining a plurality of semi persistently scheduled (SPS) configurations for a user equipment (UE), each SPS configuration allocating the UE with a set of SPS occasions for physical downlink shared channel (PDSCH) transmissions;
- detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and in response to detecting the conflict, taking at least one action to resolve the conflict, based on one or more predetermined rules, wherein the one or more predetermined rules indicate a selection criteria for choosing a new HARQ process ID from a plurality of HARQ process IDs.

20. The method of claim 19, wherein detecting the conflict comprises:
determining that the first HARQ process ID associated with the first SPS occasion and the second HARQ process ID associated with the second SPS occasion are the same, based on a HARQ ID computed from a function of a respective SPS configuration and one or more parameters; and
determining that the first HARQ process ID associated with the first SPS occasion has not been released within a threshold amount of time of an occurrence of the second SPS occasion.

21. The method of claim 19, wherein taking the at least one action to resolve the conflict comprises replacing the second HARQ process ID associated with the second SPS occasion with a third HARQ process ID, based on the one or more predetermined rules.

22. The method of claim 21, wherein:
replacing the second HARQ process ID comprises determining, based on the one or more predetermined rules, the third HARQ process ID from a plurality of HARQ process IDs shared by the plurality of SPS configurations; and
the one or more predetermined rules indicate a selection criteria for selecting the third HARQ process ID from the plurality of HARQ process IDs.

23. The method of claim 22, wherein the selection criteria comprises:
selecting a lowest available HARQ process ID from the plurality of HARQ process IDs;
selecting a highest available HARQ process ID from the plurality of HARQ process IDs; or
selecting a HARQ process ID based on at least one of a current availability of the HARQ process ID or a future availability of the HARQ process ID.

24. The method of claim 19, wherein:
taking the at least one action comprises:
determining a number of conflicts that occur prior to an occurrence of the second SPS occasion; and
when the number of conflicts exceeds a threshold number of conflicts, refraining from determining at least one third HARQ process ID of the second SPS configuration, based on a function of the second SPS configuration and one or more parameters, for a predetermined amount of time; and
the function is based on at least one of a periodicity of the second SPS configuration, a number of HARQ process IDs shared by the plurality of SPS configurations, or a HARQ process ID offset configured for the second SPS configuration.

25. The method of claim 24, wherein taking the at least one action further comprises, during the predetermined amount of time, determining the at least one third HARQ process ID of the second SPS configuration, based on the one or more predetermined rules.

26. The method of claim 24, wherein:
taking the at least one action further comprises, after the predetermined amount of time has elapsed, determining at least one fourth HARQ process ID of the second SPS configuration, based on the function of the SPS configuration and the one or more parameters; and
the at least one fourth HARQ process ID is determined based on the function after further determining at least one of: an activation of a SPS configuration, a reconfiguration of a SPS configuration, or a deactivation of a SPS configuration.

27. The method of claim 19, wherein:
taking the at least one action comprises receiving HARQ feedback for at least a third SPS occasion of one of the plurality of SPS configurations; and
the HARQ feedback comprises an indication of at least one of a HARQ process ID for the third SPS occasion, the SPS configuration associated with the third SPS occasion, or the third SPS occasion.

28. The method of claim 19, wherein taking the at least one action to resolve the conflict comprises:
refraining from assigning a HARQ process ID to the second SPS occasion, based on the one or more predetermined rules; or
at least one of:
refraining from transmitting a PDSCH to the UE during the second SPS occasion; or
transmitting a PDSCH to another UE during the second SPS occasion.

29. The method of claim 19, wherein the second HARQ process ID is determined based on at least one of a periodicity of the second SPS configuration, a number of HARQ process IDs shared by the plurality of SPS configurations, or a HARQ process ID offset configured for the second SPS configuration.

30. An apparatus for wireless communications, comprising a processing system comprising:
a memory comprising computer-executable instructions; and
one or more processors configured to execute the computer-executable instructions and cause the processing system to:
determine a plurality of semi persistently scheduled (SPS) configurations for a user equipment (UE), each SPS configuration allocating the UE with a set of SPS occasions for physical downlink shared channel (PDSCH) transmissions;
detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
in response to detecting the conflict, take at least one action to resolve the conflict, based on one or more predetermined rules, wherein the one or more predetermined rules indicate a selection criteria for choosing a new HARQ process ID from a plurality of HARQ process IDs.

\* \* \* \* \*